US012531420B2

(12) United States Patent
Hart et al.

(10) Patent No.: US 12,531,420 B2
(45) Date of Patent: Jan. 20, 2026

(54) SYSTEM-LEVEL OVERLOAD RIDE-THROUGH CONTROL STRATEGY FOR GRID-FORMING INVERTER-BASED RESOURCES

(71) Applicant: General Electric Company, Schenectady, NY (US)

(72) Inventors: Philip Joseph Hart, Rexford, NY (US); Maozhong Gong, Latham, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 619 days.

(21) Appl. No.: 17/840,716

(22) Filed: Jun. 15, 2022

(65) Prior Publication Data
US 2023/0411965 A1 Dec. 21, 2023

(51) Int. Cl.
H02J 3/38 (2006.01)
G05B 9/02 (2006.01)
(Continued)

(52) U.S. Cl.
CPC ............... *H02J 3/381* (2013.01); *G05B 9/02* (2013.01); *G05B 13/042* (2013.01);
(Continued)

(58) Field of Classification Search
CPC ...... G05B 9/02; G05B 13/042; G05B 19/042; H02J 3/001; H02J 3/0012; H02J 3/241;
(Continued)

(56) References Cited

U.S. PATENT DOCUMENTS 5,798,633 A  8/1998 Larsen et al.
7,804,184 B2  9/2010 Yuan et al.
(Continued)

FOREIGN PATENT DOCUMENTS

CN  112928938 A  6/2021
CN  114415501 A  * 4/2022 ........... G05B 13/042
(Continued)

OTHER PUBLICATIONS

European Search Report Corresponding to EP23177988 on Nov. 29, 2023.
(Continued)

Primary Examiner — Crystal J Barnes-Bullock
(74) Attorney, Agent, or Firm — Dority & Manning, P.A.

(57) ABSTRACT

A method for controlling a network of inverter-based resources (IBRs) during a disturbance includes, in response to a start of the disturbance, employing a system-level overload ride-through (SLORT) algorithm among the network of IBRs. The SLORT algorithm includes determining, via a SLORT control module, a modified parameter set for one or more of the IBRs using regularly-updated system-level analyses, transmitting, via the SLORT control module, the modified parameter set to the IBRs, and automatically activating, via one or more local controllers of the IBRs, the modified parameter set, wherein automatically activating the modified parameter set comprises rapidly re-parameterizing one or more parameters of the one or more of the IBRs for a duration of and for a time period after the disturbance so as to transition the network of IBRs from a pre-disturbance stable state to a post-disturbance stable state.

20 Claims, 17 Drawing Sheets

(51) Int. Cl.
G05B 13/04 (2006.01)
G05B 19/042 (2006.01)
H02J 3/00 (2006.01)
H02J 3/40 (2006.01)

(52) U.S. Cl.
CPC .......... *G05B 19/042* (2013.01); *H02J 3/0012* (2020.01); *H02J 3/40* (2013.01); *G05B 2219/2639* (2013.01)

(58) Field of Classification Search
CPC .... H02J 3/32; H02J 3/381; H02J 3/388; H02J 3/40; H02J 3/48; H02J 3/50; H02M 7/537
See application file for complete search history.

(56) References Cited

U.S. PATENT DOCUMENTS

| | | | |
|---|---|---|---|
| 8,280,533 B2* | 10/2012 | Wojsznis | G05B 13/042 703/2 |
| 9,270,194 B2 | 2/2016 | Brogan et al. | |
| 10,756,536 B2 | 8/2020 | Kral et al. | |
| 10,879,785 B2 | 12/2020 | Shuai et al. | |
| 11,680,558 B2 | 6/2023 | Howard et al. | |
| 2019/0093634 A1 | 3/2019 | Biris et al. | |
| 2022/0137118 A1 | 5/2022 | Holliday, III et al. | |

FOREIGN PATENT DOCUMENTS

| | | | | |
|---|---|---|---|---|
| CN | 112636368 B | * | 2/2023 | ............ H02J 3/241 |
| EP | 3971414 A1 | | 3/2022 | |
| JP | 6523446 B2 | | 5/2019 | |
| WO | WO2021/145877 A1 | | 7/2021 | |

OTHER PUBLICATIONS

Buraimoh, Fault Ride-Through Analysis of Current and Voltage-Source Models of Grid Supporting Inverter-Based Microgrid, IEEE Canadian Journal of Electrical and Computer Engineering, vol. 44, No. 2, 2021, 10 pages.

Rathnayake et al., Grid Forming Inverter Modeling, Control, and Applications, IEEE Power & Energy Society Section, vol. 9, 2021, 114781-114807.

Andrade et al., Study of Large-Signal Stability of an Inverter-Based Generator Using a Lyapunov Function, 40th Annual Conference of the IEEE Industrial Electronics Society, 2014, pp. 1840-1846. (Abstract Only) https://ieeexplore.ieee.org/document/7048752.

Awal et al., Unified Virtual Oscillator Control for Grid-Forming and Grid-Following Converters, IEEE Journal of Emerging and Selected Topics in Power Electronics, vol. 9, Issue 4, Aug. 2021, pp. 4573-4586. (Abstract Only) https://ieeexplore.ieee.org/abstract/document/9203895.

Bergen et al., A Structure Preserving Model for Power System Stability Analysis, IEEE Transactions on Power Apparatus and Systems, vol. PAS-100, Issue 1, Jan. 1981, pp. 25-35. (Abstract Only) https://ieeexplore.ieee.org/document/4110445.

Brabandere et al., Small-Signal Stability of Grids with Distributed Low-Inertia Generators Taking into Account Line Phasor Dynamics, 18th International Conference and Exhibition on Electricity Distribution, 2005. (Abstract Only) https://ieeexplore.ieee.org/Document/5428013.

Cheema et al., Modification in Active Power-Frequency Loop of Virtual Synchronous Generator to Improve the Transient Stability, International Journal of Electrical Power & Energy Systems, 106668, vol. 128, Jun. 2021. (Abstract Only) https://doi.org/10.1016/j.ijepes.2020.106668.

Choi et al., Cascading Collapse of a Large-Scale Mixed Source Microgrid Caused by Fast-Acting Inverter-Based Distributed Energy Resources, IEEE Transaction on Industry Applications, vol. 54, Issue 6, Nov.-Dec. 2018, pp. 5727-5735. (Abstract Only) https://ieeexplore.ieee.org/document/8409294.

D'Arco et al., Virtual Synchronous Machines—Classification of Implementations and Analysis of Equivalence to Droop Controllers for Microgrids, 2013 IEEE Grenoble Conference, 2013, pp. 1-7. (Abstract Only) https://ieeexplore.ieee.org/document/6652456.

Davy et al., Lyapunov Functions for Multimachine Power Systems with Dynamic Loads, IEEE Transactions on Circuits and Systems I: Fundamental Theory and Applications, vol. 44, Issue 9, Sep. 1997, pp. 796-812. (Abstract Only) https://ieeexplore.ieee.org/document/622983.

Dedeoglu et al., Grid-Supporting Three-Phase Inverters with Inherent Root Mean Square Current Limitation Under Balanced Grid Voltage Sags, IEEE Transactions on Industrial Electronics, vol. 68, Issue 11, Nov. 2021, pp. 11379-11389. (Abstract Only) https://ieeexplore.ieee.org/document/9248628.

Demarco et al., A Generalized Eigenvalue Perturbation Approach to Coherency, Proceedings of International Conference Control Applications, 1995, pp. 611-617. (Abstract Only) https://ieeexplore.ieee.org/document/555802.

Du et al., Voltage-Source Control of PV Inverter in a CERTS Microgrid, IEEE Transactions on Power Delivery, vol. 29, No. 4, Feb. 2014, pp. 1726-1734. (Abstract Only) https://ieeexplore.ieee.org/document/6740077.

Erickson et al., Improved Power Control Bandwidth of Grid-Forming Sources in a CERTS Microgrid, IEEE Energy Conversion Congress and Exposition (ECCE), 2012, pp. 2366-2373. (Abstract Only) https://ieeexplore.ieee.org/document/6342459.

Eskandari et al., On the Impact of Fault Ride-Through on Transient Stability of Autonomous Microgrids: Nonlinear Analysis and Solution, IEEE Transactions on Smart Grid, vol. 12, Issue 2, Mar. 2021, pp. 999-1010. (Abstract Only) https://ieeexplore.ieee.org/document/9220790.

Gkountaras et al., Evaluation of Current Limiting Methods for Grid Forming Inverters in Medium Voltage Microgrids, 2015 IEEE Energy Conversion Congress and Exposition (ECCE), Sep. 2015, pp. 1223-1230. (Abstract Only) https://ieeexplore.ieee.org/document/7309831.

Groß et al., Projected Grid-Forming Control for Current-Limiting of Power Converters, Annual Allerton Conference on Communication, Control, and Computing, Sep. 2019, pp. 326-333. (Abstract Only) https://ieeexplore.ieee.org/document/8919856.

Hart et al., Coherency Identification and Aggregation in Grid-Forming Droop-Controlled Inverter Networks, IEEE Transactions on Industry Applications, vol. 55, Issue 3, May-Jun. 2019, pp. 2219-2231. (Abstract Only) https://ieeexplore.ieee.org/document/8606184.

Hart et al., Energy Function for a Grid-Tied, Droop-Controlled Inverter, 2014 North American Power Symposium (NAPS), Sep. 2014, pp. 1-6. (Abstract Only) https://ieeexplore.ieee.org/document/6965437.

Hart et al., Enforcing Coherency in Droop-Controlled Inverter Networks Through Use of Advanced Voltage Regulation and Virtual Impedance, IEEE Energy Conversion Congress and Exposition (ECCE), 2017, pp. 3367-3374. (Abstract Only) https://ieeexplore.ieee.org/abstract/document/8096605.

Hart, Reduced-Order Modeling and Analysis of Droop-Controlled, Inverter-Based Distributed Generation Networks, ProQuest Ph.D. Dissertations and Theis, The University of Wisconsin—Madison, vol. 79-04(E), Section B, 2017, 370 Pages. (Abstract Only) https://ui.adsabs.harvard.edu/abs/2017PhDT.......176H/abstract.

Kabalan et al., Nonlinear Lyapunov Stability Analysis of Seven Models of a DC/AC Droop Controlled Inverter Connected to an Infinite Bus, IEEE Transactions on Smart Grid, vol. 10, Issue 1, Jan. 2019, pp. 772-781. (Abstract Only) https://ieeexplore.ieee.org/document/8036269.

Klump et al., A New Method for Finding Low-Voltage Power Flow Solutions, 2000 Power Engineering Society Summer Meeting (Cat. No. 00CH37134), vol. 1, 2000, pp. 593-597. (Abstract Only) https://ieeexplore.ieee.org/document/867653.

Li et al., A New Current Limiting and Overload Protection Scheme for Distributed Inverters in Microgrids Under Grid Faults, IEEE Transactions on Industry Applications, vol. 57, Issue 6, Nov.-Dec. 2021, pp. 6362-6374. (Abstract Only) https://ieeexplore.ieee.org/document/9511809.

(56) References Cited

OTHER PUBLICATIONS

Mitra et al., A Homotopy-Based Method for Robust Computation of Controlling Unstable Equilibrium Points, IEEE Transactions on Power Systems, vol. 35, Issue 2, Mar. 2020, pp. 1422-1431. (Abstract Only) https://ieeexplore.ieee.org/document/8846055.

Paquette et al., Virtual Impedance Current Limiting for Inverters in Microgrids with Synchronous Generators, IEEE Transactions on Industry Applications, vol. 51, Issue 2, Mar.-Apr. 2015, pp. 1630-1638. (Abstract Only) https://ieeexplore.ieee.org/abstract/document/6872529 https://www.semanticscholar.org/paper/Virtual-Impedance-Current-Limiting-for-Inverters-in-Paquette-Divan/64a504d3d04a522f9b9b2c5d3938ae165c66bd6d#paper-header.

Pattabiraman et al., Transient Stability Modeling of Droop-Controlled Grid-Forming Inverters with Fault Current Limiting, 2020 IEEE Power & Energy Society General Meeting (PEGSM), Aug. 2020, pp. 1-5. (Abstract Only) https://ieeexplore.ieee.org/document/281712.

Piagi, Microgrid Control, Dissertation or Thesis, University of Wisconsin-Madison, 2005. (Abstract Only).

Qoria et al., Critical Clearing Time Determination and Enhancement of Grid-Forming Converters Embedding Virtual Impedance as Current Limitation Algorithm, IEEE Journal of Emerging and Selected Topics in Power Electronics, vol. 8, Issue 2, Jun. 2020, pp. 1050-1061. (Abstract Only) https://ieeexplore.ieee.org/document//8931732.

Qoria et al., Current Limiting Algorithms and Transient Stability Analysis of Grid-Forming VSCs, Electric Power Systems Research, vol. 189, Dec. 2020. (Abstract Only) https://www.sciencedirect.com/science/article/abs/pii/S0378779620305290.

Rosso et al., On the Implementation of an FRT Strategy for Grid-Forming Converters Under Symmetrical and Asymmetrical Grid Faults, IEEE Transactions on Industry Applications, vol. 57, Issue 5, 2021, pp. 4385-4397. (Abstract Only) https://ieeexplore.ieee.org/document//9477148.

Schiffer et al., Conditions for Stability of Droop-Controlled Inverter-Based Microgrids, Automatica, vol. 50, Issue 10, Oct. 2014, pp. 2457-2469. (Abstract Only) https://www.sciencedirect.com/science/article/abs/pii/S0005109814003100.

Shi et al., Low-Voltage Ride-Through Control Strategy for a Virtual Synchronous Generator Based on Smooth Switching, IEEE Access, vol. 6, 2018, pp. 2703-2711. (Abstract Only) https://ieeexplore.ieee.org/document/8225632.

Shuai et al., Transient Angle Stability of Virtual Synchronous Generators Using Lyapunov's Direct Method, IEEE Transactions on Smart Grid, vol. 10, Issue 4, Jul. 2019, pp. 4648-4661. (Abstract Only) https://ieeexplore.ieee.org/document/8444083.

Simpson-Porco et al., Synchronization and Power Sharing for Droop-Controlled Inverters in Islanded Microgrids, Automatica, vol. 49, Issue 9, Sep. 2013, pp. 2603-2611. (Abstract Only) https://www.sciencedirect.com/science/article/abs/pii/S0005109813002884.

Tang et al., Coordinated Control of Adaptive Damping and Additional Torque for Transient Stability Improvement of Virtual Synchronous Generator, 2021 IEEE $4^{th}$ International Conference on Computing, Power and Communication Technologies (GUCON), 2021, pp. 1-5. (Abstract Only) https://ieeexplore.ieee.org/document/9573550.

Taul et al., Current Limiting Control with Enhanced Dynamics of Grid-Forming Converters During Fault Conditions, IEEE Journal of Emerging and Selected Topics in Power Electronics, vol. 8, No. 2, Jun. 2020, pp. 1062-1073. https://ieeexplore.ieee.org/stamp/stamp.jsp?tp=&arnumber=8779657.

Varaiya et al., Direct Methods for Transient Stability Analysis of Power Systems: Recent Results, Proceedings of the IEEE, vol. 73, Issue 12, Dec. 1985, pp. 1703-1985. (Abstract Only) https://ieeexplore.ieee.org/abstract/document/1457634.

Vilathgamuwa et al., Protection of Microgrids During Utility Voltage Sags, IEEE Transactions on Industrial Electronics, vol. 53, Issue 5, Oct. 2006, pp. 1427-1436. (Abstract Only) https://ieeexplore.ieee.org/document/1705634.

Wu et al., A Mode-Adaptive Power-Angle Control Method for Transient Stability Enhancement of Virtual Synchronous Generators, IEEE Journal of Emerging and Selected Topics in Power Electronics, vol. 8, Issue 2, Jun. 2020, pp. 1034-1049. (Abstract Only) https://ieeexplore.ieee.org/document/9016216.

Xin et al., Synchronous Instability Mechanism of P-f Droop-Controlled Voltage Source Converter Caused by Current Saturation, IEEE Transactions on Power Systems, vol. 31, Issue 6, Nov. 2016, pp. 5206-5207. (Abstract Only) https://ieeexplore.ieee.org/document/7406768.

Xiong et al., Transient Damping Method for Improving the Synchronization Stability of Virtual Synchronous Generators, IEEE Transactions on Power Electronics, vol. 36, Issue 7, Jul. 2021, pp. 7820-7831. (Abstract Only) https://ieeexplore.ieee.org/document/9303430.

Zhang et al., Coordinated Utilization of Adaptive Inertia Control and Virtual Impedance Regulation for Transient Performance Increase of VSG Under Different Faults, 2021 $6^{th}$ Asia Conference on Power and Electrical Engineering (ACPEE), Apr. 2021, pp. 838-843. (Abstract Only) https://ieeexplore.ieee.org/document/9437123.

Zheng et al., Model Predictive Control-Based Virtual Inertia Emulator for an Islanded Alternating Current Microgrid, IEEE Transactions on Industrial Electronics, vol. 68, Issue 8, Aug. 2021, pp. 7167-7177. (Abstract Only) https://ieeexplore.ieee.org/document/9138790.

Zhong et al., Transient Stability Enhancement for Virtual Synchronous Generator by Combining Direct Power Control, IEEE Energy Conversion Congress and Exposition (ECCE), 2021, pp. 323-328. (Abstract Only) https://ieeexplore.ieee.org/document/9595568.

\* cited by examiner

SYSTEM-LEVEL OVERLOAD RIDE-THROUGH CONTROL STRATEGY FOR GRID-FORMING INVERTER-BASED RESOURCES

STATEMENT REGARDING FEDERALLY SPONSORED RESEARCH OR DEVELOPMENT

This invention was made with Government support under Contract No. DE-EE0009024 awarded by the United States Department of Energy. The Government has certain rights in this invention.

FIELD

The present disclosure relates generally to inverter-based resources, such as wind turbine generators and, more particularly, to systems and methods for controlling a network of inverter-based resources connected to a power grid during a large disturbance.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Furthermore, many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g., the turbine control portion of a wind turbine. This is conveyed as a torque reference, which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming (GFM) inverter-based resources (IBR) act as a voltage source behind an impedance and provide a voltage-source characteristic, where the angle and magnitude of the voltage are controlled to achieve the regulation functions needed by the grid. The term IBR connotes an inverter that converts direct current (dc) to alternating current (ac) and which may be used to interface any energy source to an ac power system. Energy sources can possibly include, but are not limited to, a renewable source such as solar photovoltaic array, wind turbine, battery energy storage, ultracapacitor or fossil-fuel based source such as a diesel or natural gas genset, STATCOM, HVDC VSC, or any combination of these energy sources tied to a dc network. Moreover, the term "grid-forming IBR" is generally defined as an IBR that employs a local controller to "stiffly" regulate both (1) the local ac voltage magnitude and (2) local ac frequency (or phase angle) in the fast time-scale. In other words, the response time of the local controller voltage regulation and frequency (or phase) regulation loop is assumed to be well below 100 milliseconds (ms). The disturbance rejection and/or feedback control performance of the voltage and frequency (or phase) regulation loops are sufficiently high-bandwidth (or "stiff") that the voltage and frequency changes only moderately in the face of unexpected grid events throughout a sliding time window of approximately 100 ms.

In addition, the impedance of the GFM IBR is normally dictated by the hardware of the system, such as reactors, transformers, or rotating machine impedances. With this structure, current will flow according to the demands of the grid, while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

In particular, a simple circuit of a full-conversion grid-forming inverter-based resource connected to a grid is shown in FIG. 2, where the voltage $E_1$ and angle $\delta_1$ reflect quantities synthesized by the grid-forming resource and $X_{term}$ is the reactance of the grid-forming resource. The steady-state power flow in the system is characterized by the following relationship:

$$P_T = (E_1 V_{thev}/(X_{term}+X_{thev}))*\sin(\delta_1-\theta th) \cong (E_1 V_{thev}/(X_{term}+X_{thev}))*(\delta_1-\theta th) \quad \text{Equation (1)}$$

The power generated by the grid-forming resource depends on the external grid voltage ($V_{thev}$) and grid impedance ($X_{thev}$), which are generally unknown and changing. Therefore, for conventional systems, control of the grid-forming resource is practically realized by controlling the voltage source with respect to a locally measured voltage and angle ($V_T$ and $\theta_T$). The active power equation can therefore be written as follows:

$$P_T = (E_1 V_T/X_{term})*\sin(\delta_{1T}) = (E_1 V_T/X_{term})*\delta_{1T} \quad \text{Equation (2)}$$

where $\delta_{1T}$ reflects the difference between the grid-forming resource physical voltage angle and the locally measured angle. As such, the active power dynamics of the system are related to the impedance of the system as follows:

$$dP_T/d\delta_{1T} \alpha 1/X_{term} \quad \text{Equation (3)}$$

Referring now to FIG. 3, a schematic diagram for controlling active power and voltage for an inverter-based resource is illustrated. As shown, output $E_1$ reflects the desired converter voltage magnitude and output $\delta_{1T}$ reflects the desired converter voltage angle with respect to a locally measured angle ($\theta_T$). Accordingly, the active power output and voltage are controlled through manipulation of the converter voltage so that the resulting voltage drop across the internal reactance ($X_{term}$) achieves the desired control objectives. This voltage drop is given by the following equation:

$$V_T = E_1 - j*X_{term}*I_T \quad \text{Equation (4)}$$

The $X_{term}$, however, is typically dictated by the hardware of the power circuit and may include reactors and/or transformer impedance. Furthermore, with grid-forming control, current changes rapidly when there are grid disturbances. Therefore, for conventional systems, the control action is typically gradual to restore the steady-state operating conditions commanded by higher-level controls. The amount of current change is inversely related to the total impedance of the circuit. As such, if the current exceeds limits, the control responds rapidly to force the current to be within limits. However, this drastic nonlinearity can cause chaotic behavior when applied to a grid consisting of many other similar systems. Alternatively, if the current change is too small, then the grid-forming system will not contribute as much as it could to support the grid.

Thus, transient power-limiting during a disturbance is a challenging task for GFM IBRs. Thus, referring now to FIG. 4, an example power limit mode is illustrated. As shown, the power limit mode provides a transient power-limiting control solution for grid-forming inverters by activating a usually-dormant PI regulator if an active power threshold $P_{ac}$ is surpassed during a limiting transient to drive the power back to a $P_{max}$ setting using the frequency reference. While this method has performed well within a microgrid setting, it is not always clear how much active power reserve (i.e., the difference between the $P_{MAX}$ setting and the PV's maximum power point (MPP)) is needed. Some amount of power reserve is needed due to inter-inverter dynamics during the transient. A conservatively low value for $P_{max}$, well below the MPP of a PV array, results in improved likelihood of a stable transient, but also requires significant PV curtailment in anticipation of the load step change.

There is also a potential for a cascading instability to occur due to system interactions, wherein an inverter exhausts its prime mover and trips despite activation of the power limit mode, and the tripping event subsequently overloads neighboring source(s). The power limit mode is also less effective at current limiting during faults.

Accordingly, an alternative to the aforementioned power limit mode is rapid application of a transient virtual impedance, which is a promising approach by which to provide critical current-limiting capability for grid-forming inverter-based resources during severe grid events. In comparison with other current-limiting methods (such as mode-switching to a grid-following control mode), virtual-impedance-based approaches can provide more reliable and predictable performance for a wide range of possible grid events. In particular, once activated, this method temporarily drops the inverter output voltage proportional to the output current. However, it is often unclear when to activate the transient virtual impedance, and how much virtual impedance to apply. For example, too little virtual impedance risks depletion of the dc bus voltage, and too much virtual impedance can result in deleterious loss of synchronism between GFM IBRs and reduced power quality. It is also unclear how much reserve is needed for power limiting.

In addition, virtual-impedance-based approaches do not address stability or optimality. Once multiple grid-forming IBRs activate virtual impedance to successfully ride-through an event, it is difficult to guarantee that that the IBRs will maintain synchronism with one-another, as angle wind-up may occur during the event due to the mismatch between the active power setpoint and the measured active power. This high potential for loss of synchronism may result in large active power transfer upon deactivation of the virtual impedance, necessitating a limit-cycle-like repetitive re-application of the voltage-reduction-based overload ride-through control, with no guarantee that a stable synchronism can be achieved. Accordingly, conventional overload ride-through control systems are generally exclusively local in nature and do not take into account the possible presence of additional grid-forming IBRs (including other grid-forming IBR, synchronous machines and/or the bulk power system) in their determination of modified parameter settings or augmented control of the grid-forming IBR(s).

Thus, the present disclosure is directed to a system and method that addresses the aforementioned issues. In particular, the present disclosure is directed to system-level overload ride-through control that employs online system-level analysis and control action to enhance the resiliency of a system of one or more grid-forming IBRs throughout the duration and aftermath of a severe grid event.

BRIEF DESCRIPTION

Aspects and advantages of the invention will be set forth in part in the following description, or may be obvious from the description, or may be learned through practice of the invention.

In an aspect, the present disclosure is directed to a method for controlling a network of inverter-based resources connected to a power grid during a disturbance. The method includes, in response to a start of the disturbance, employing a system-level overload ride-through algorithm among the network of inverter-based resources. The system-level overload ride-through algorithm includes determining, via a system-level overload ride-through control module, a modified parameter set for one or more of the inverter-based resources using regularly-updated system-level analyses. The system-level overload ride-through algorithm also includes transmitting, via the system-level overload ride-through control module, the modified parameter set to the one or more of the inverter-based resources. Further, the system-level overload ride-through algorithm includes automatically activating, via one or more local controllers of the one or more of the inverter-based resources communicatively coupled with the system-level overload ride-through control module, the modified parameter set at a time determined locally by the one or more local controllers. Moreover, automatically activating the modified parameter set includes rapidly re-parameterizing one or more parameters of the one or more of the inverter-based resources for a duration of and for a time period after the disturbance so as to transition the network of inverter-based resources from a pre-disturbance stable state to a post-disturbance stable state.

In another aspect, the present disclosure is directed to a system for controlling a network of inverter-based resources connected to a power grid during a disturbance. The system includes a system-level overload ride-through control module for controlling the system and a plurality of local controllers communicatively coupled to the system-level overload ride-through control module for controlling the inverter-based resources. The system-level overload ride-through control module includes at least one processor configured to perform a plurality of operations. The plurality of operations include, in response to a start of the disturbance, employing a system-level overload ride-through algorithm among the network of inverter-based resources. The system-level overload ride-through algorithm includes determining, via a system-level overload ride-through control module, a modified parameter set for one or more of the inverter-based resources using regularly-updated system-level analyses. The system-level overload ride-through algorithm also includes transmitting, via the system-level overload ride-through control module, the modified parameter set to the one or more of the inverter-based resources. Further, the system-level overload ride-through algorithm includes automatically activating, via one or more local controllers of the one or more of the inverter-based resources communicatively coupled with the system-level overload ride-through control module, the modified parameter set at a time determined locally by the one or more local controllers. Moreover, automatically activating the modified parameter set includes rapidly re-parameterizing one or more parameters of the one or more of the inverter-based resources for a duration of and for a time period after the disturbance so as to transition the network of inverter-based resources from a pre-disturbance stable state to a post-disturbance stable state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
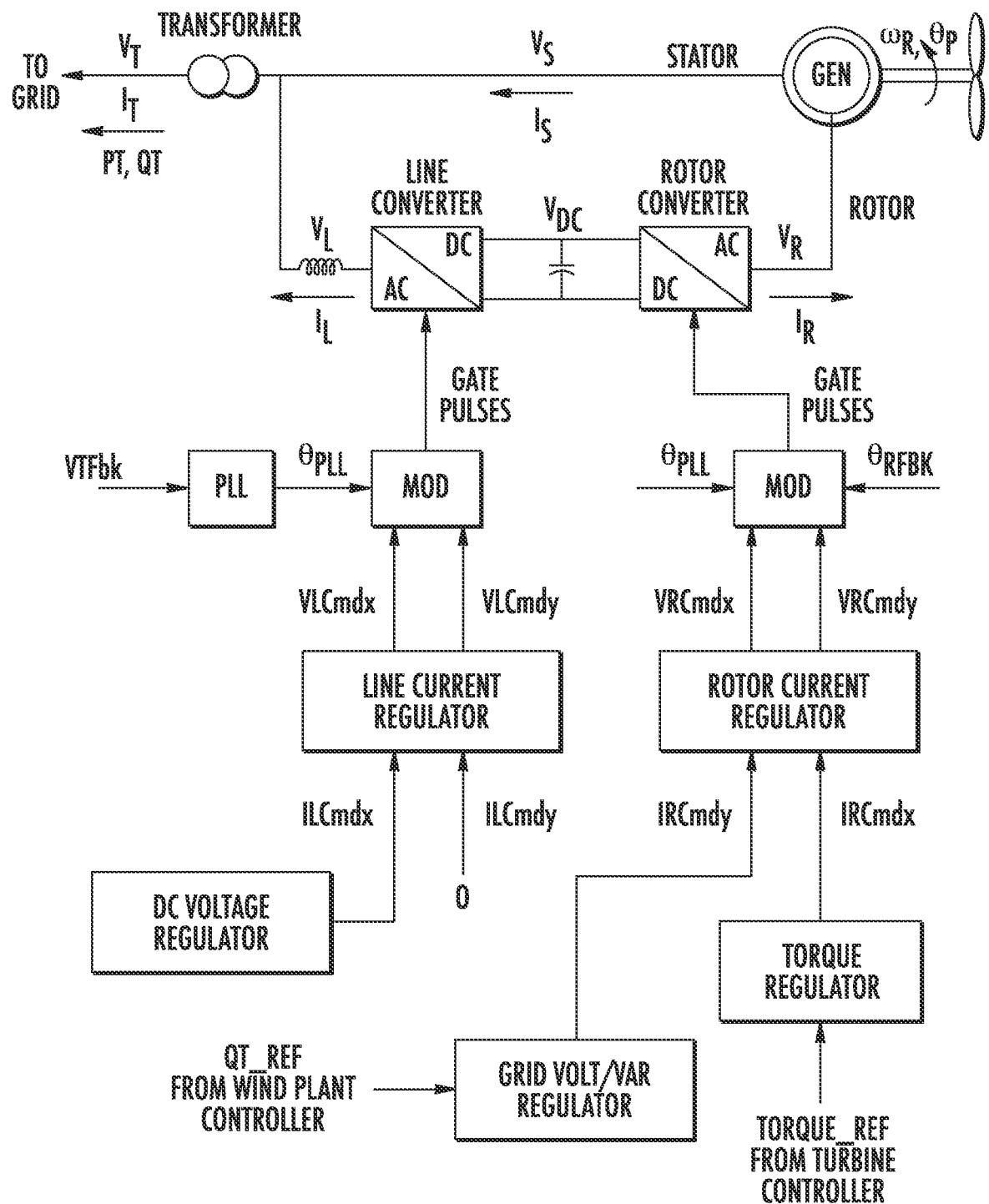
FIG. 1 illustrates a one-line diagram of a double-fed wind turbine generator with structure of converter controls for grid-following application according to conventional construction.
Figure 2:
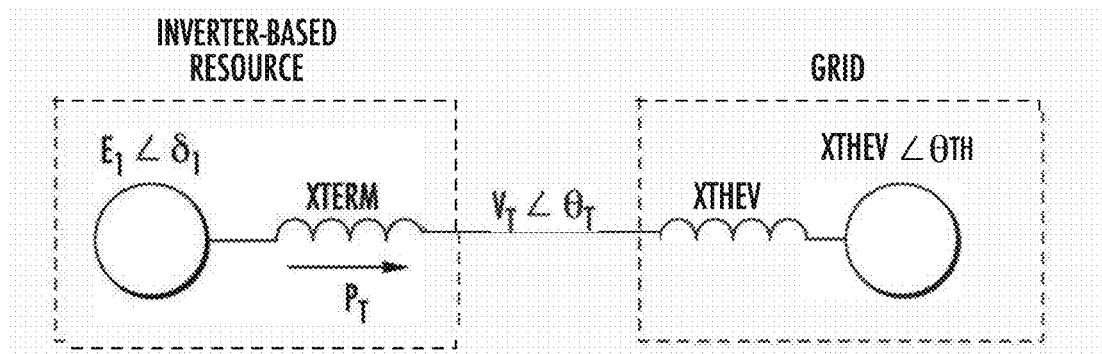
FIG. 2 illustrates a circuit diagram of one embodiment of a grid-connected grid-forming inverter-based resource according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a system-level overload ride-through control system that employs online system-level analysis and corresponding control actions to enhance the resiliency of a system of one or more inverter-based resources (IBRs) (that can be grid-forming or grid-following) throughout the duration and aftermath of a severe grid event. In an embodiment, the control action may include preemptive transmission of an individualized modified parameter set to each IBR that can be automatically activated locally by that IBR at a time determined locally by the IBR. Generally, the time of activation of the modified parameter set corresponds to the instant of time at which the local controller associated with that IBR detects an overload, which is likely to be in the initial moments of a sufficiently-severe grid event.

Upon detecting such a grid event, an IBR that has received a modified parameter set previously transmitted from a system-level overload ride-through control module will rapidly re-parameterize its local frequency, voltage, and/or virtual impedance control functions using the values included in the latest modified parameter set that it has received. Otherwise, if no severe event is detected by that inverter-based resource, the nominal operating parameters continue to be used. The values of the parameters within the modified parameter set may differ between the IBRs. Further, these parameters may be optimally selected using regularly-updated system-level analyses conducted by the system-level module. As such, the proposed system-level overload ride-through control strategy has multiple objectives during and after the event. Such objectives may include, for example, (1) self-protection, (2) stability, and (3) optimality. Self-protection, through the overload control action, eliminates the possibility that the transient current, transient active power, or transient energy drawn from or absorbed by any IBR during or after an unexpected event will exceed the capability of that IBR and result in the IBR being forced to trip offline. Moreover, the system should remain asymptotically stable (in-the-large) following the grid event. Achievement of stability 'in-the-large' generally means that the IBRs do not lose synchronism with one another or with the bulk power system (should they be connected to the bulk power system) in the aftermath of the event (e.g., after a fault clears). Further, each IBR should satisfy reactive and/or active power requests to the extent possible during and after the overload event.

Figure 5:
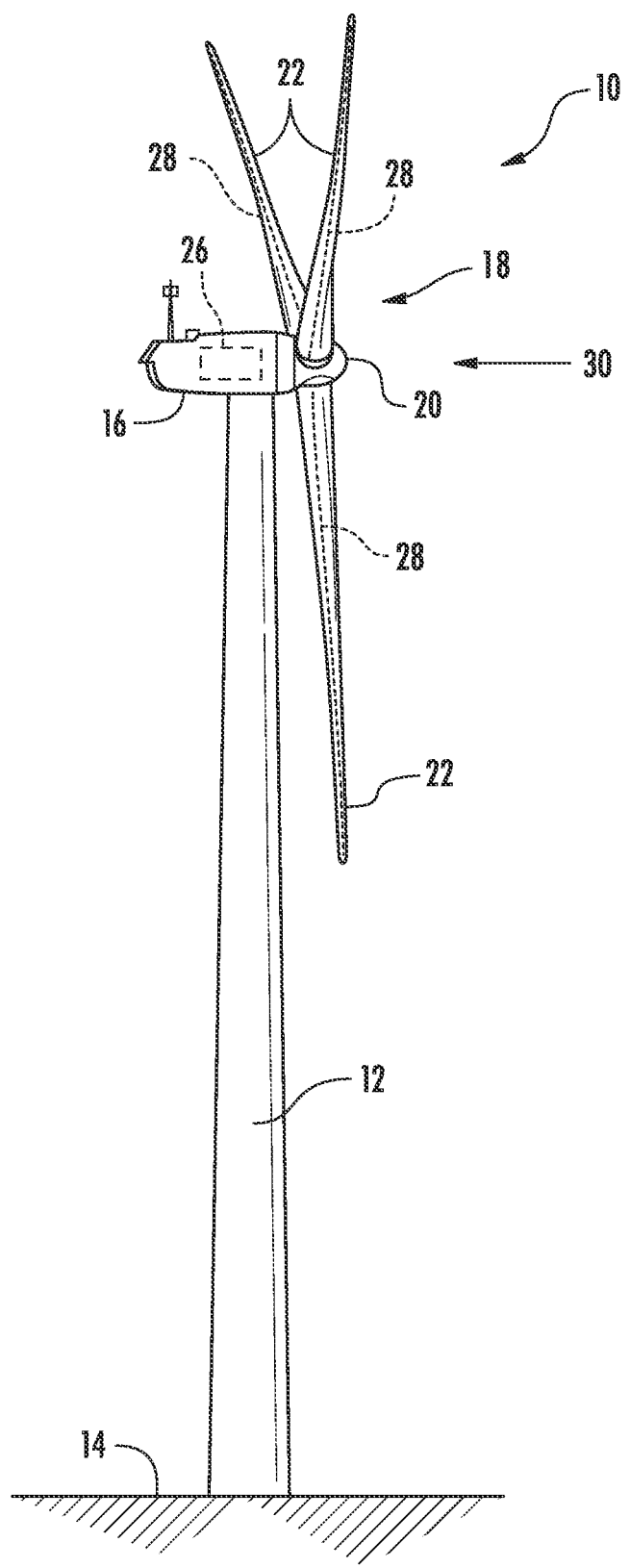
FIG. 5 illustrates a perspective view of one embodiment of a wind turbine according to the present disclosure.

Referring now to the drawings, FIG. 5 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 6) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 4:
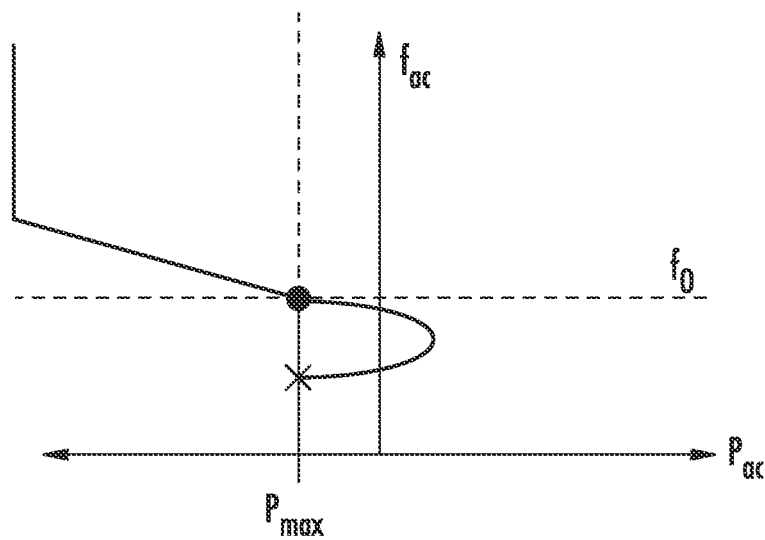
FIG. 4 illustrates a schematic diagram of an embodiment of a power limit mode droop diagram with a parametric transient plot that shows how extra power margin is required according to conventional construction.
Figure 6:
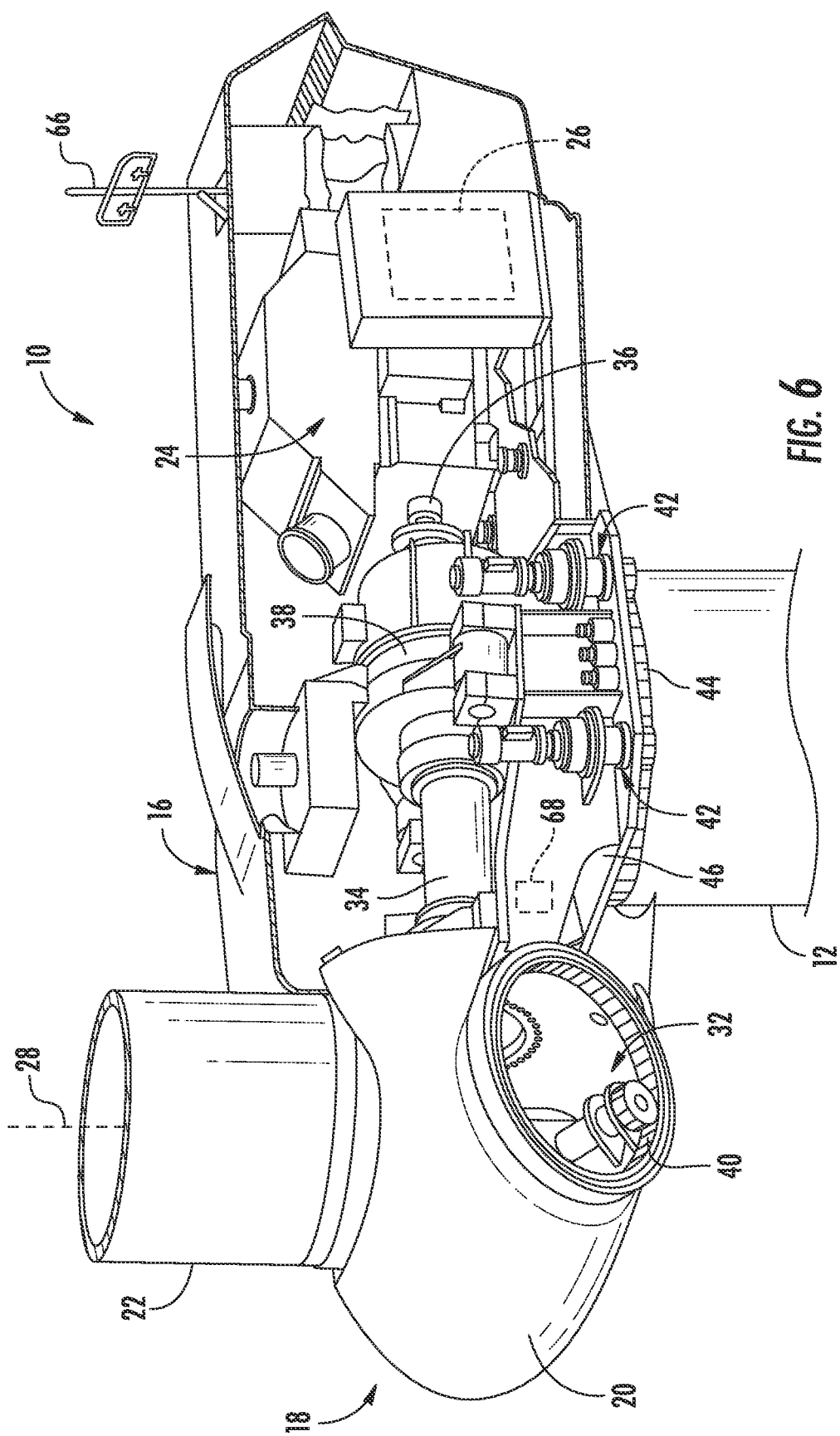
FIG. 6 illustrates a simplified, internal view of one embodiment of a nacelle according to the present disclosure.

Referring now to FIG. 6, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 30, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 7:
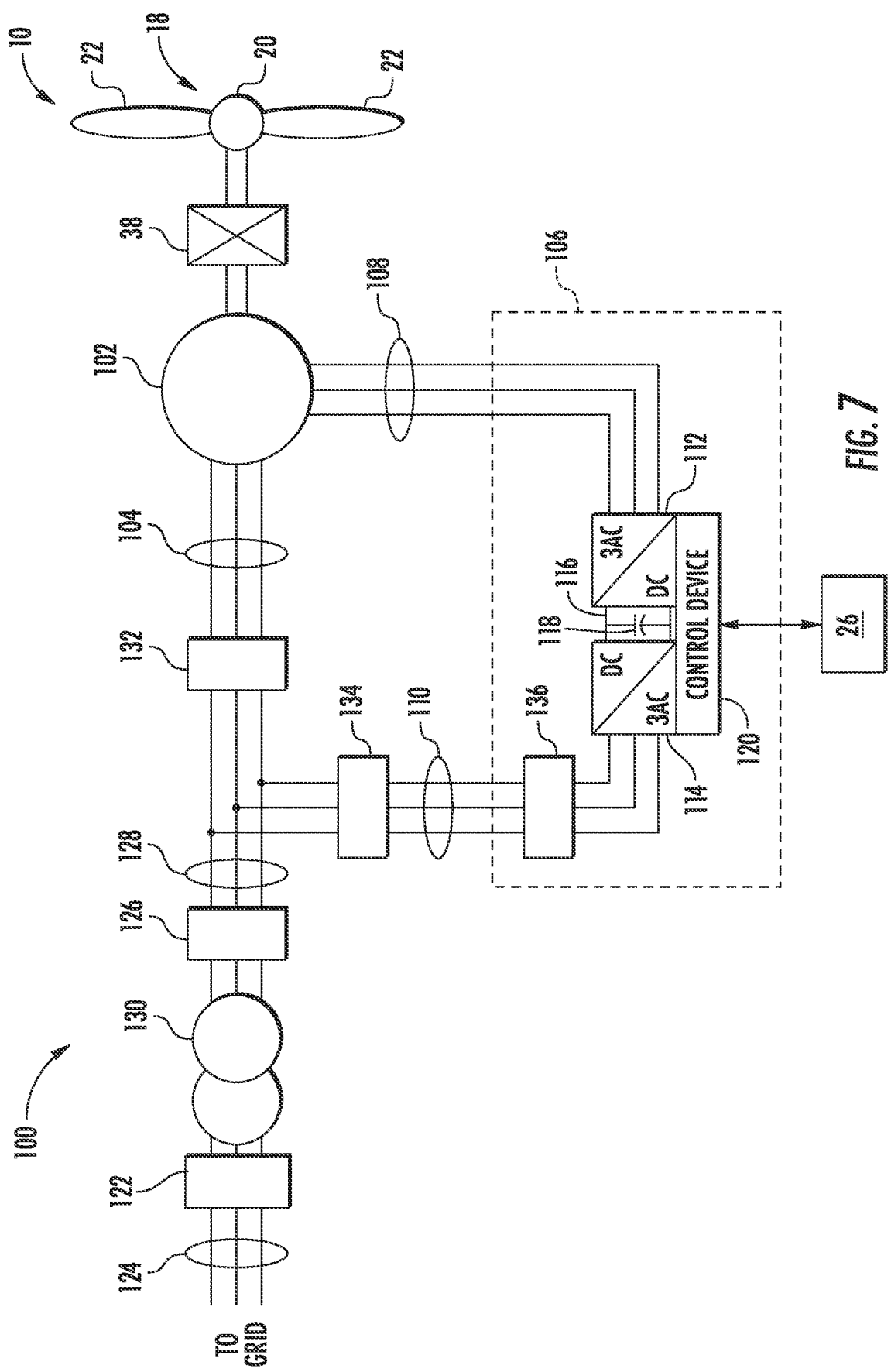
FIG. 7 illustrates a schematic view of one embodiment of a wind turbine electrical power system suitable for use with the wind turbine shown in FIG. 4.

Referring now to FIG. 7, a schematic diagram of one embodiment of a wind turbine power system 100 is illustrated in accordance with aspects of the present disclosure. Although the present disclosure will generally be described herein with reference to the system 100 shown in FIG. 7, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 7 and as mentioned, the rotor 18 of the wind turbine 10 (FIG. 5) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g., IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 8:
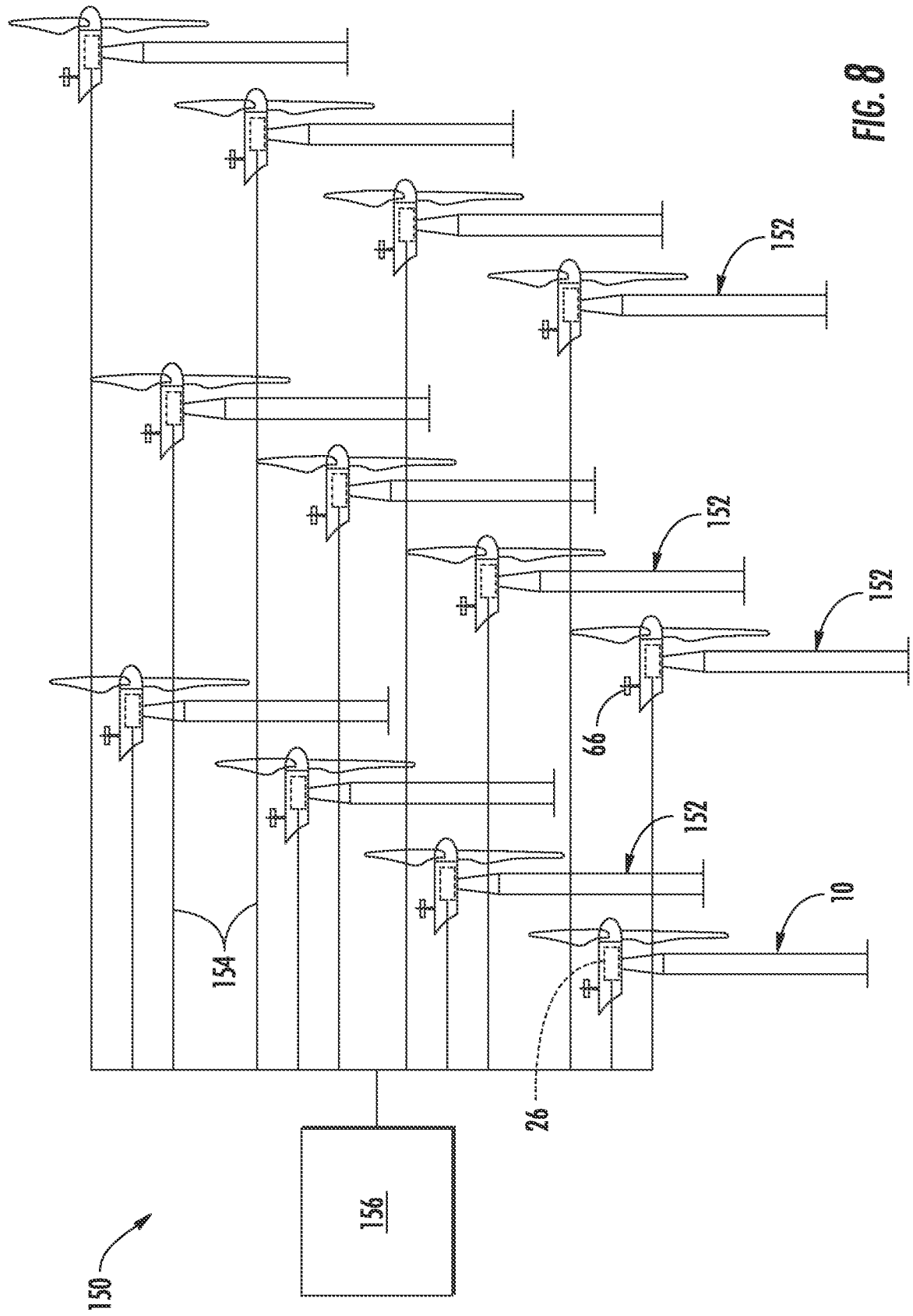
FIG. 8 illustrates a schematic view of one embodiment of a wind farm having a plurality of wind turbines according to the present disclosure.

Referring now to FIG. 8, the wind turbine power system 100 described herein may be part of a wind farm 150. As shown, the wind farm 150 may include a plurality of wind turbines 152, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g., through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Figure 9:
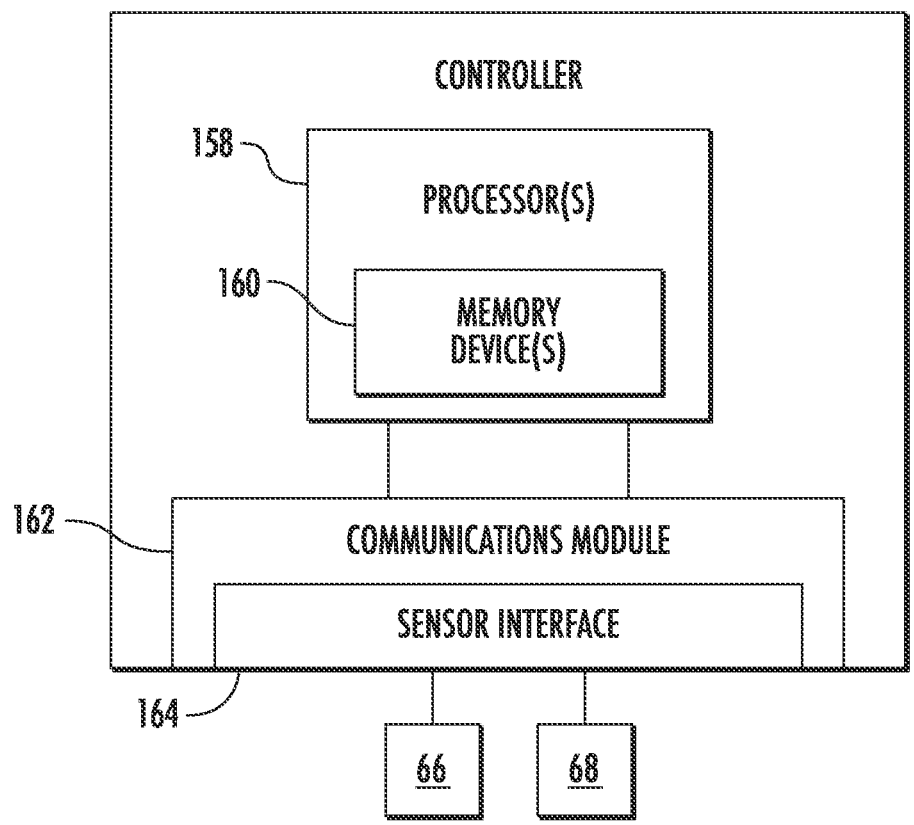
FIG. 9 illustrates a block diagram of one embodiment of a controller according to the present disclosure.

Referring now to FIG. 9, a block diagram of one embodiment of suitable components that may be included within the controller (such as any one of the turbine controller 26, the converter controller 120, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 160 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 66, 68 to be converted into signals that can be understood and processed by the processor(s) 158.

Figure 10:
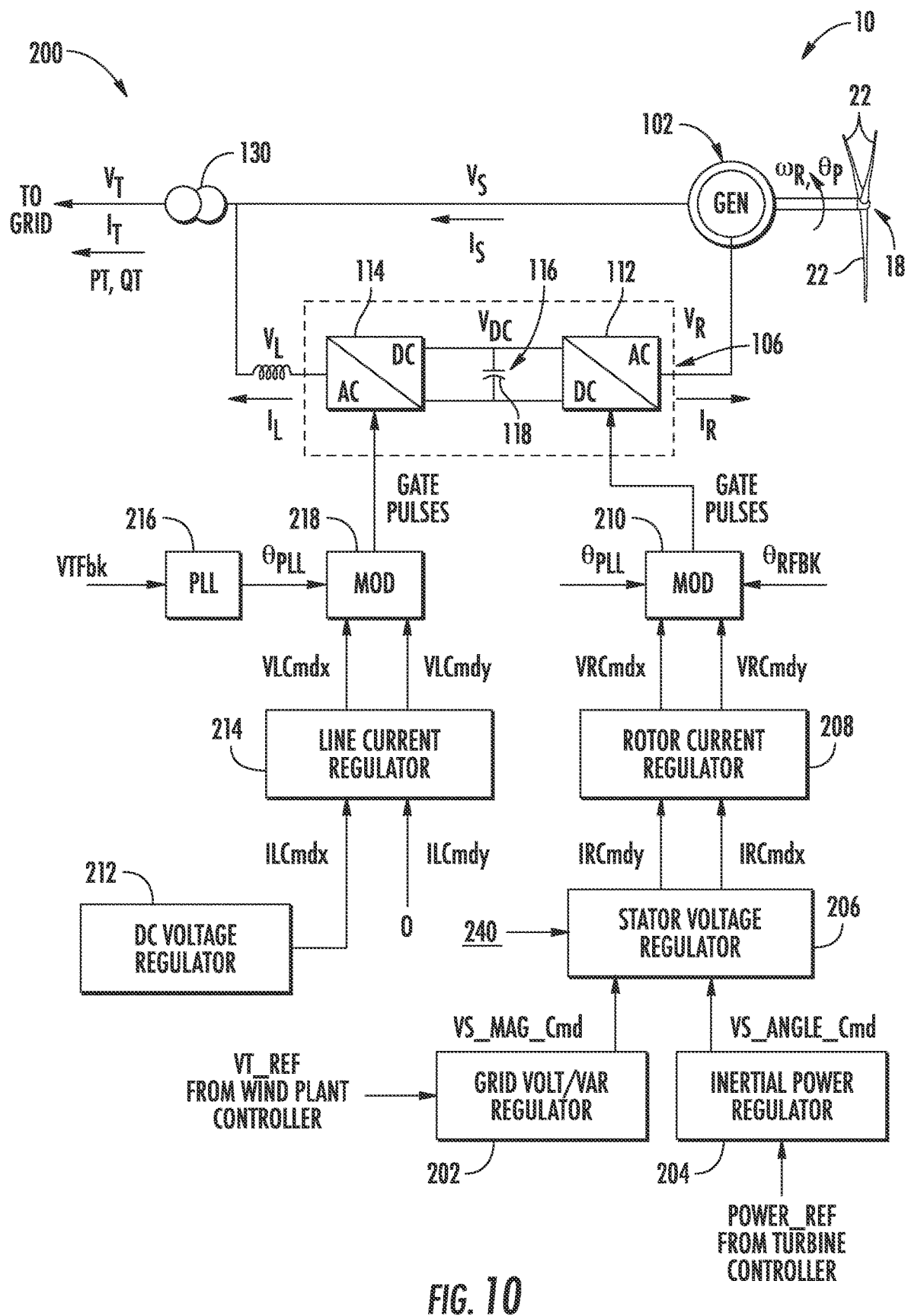
FIG. 10 illustrates a one-line diagram of a double-fed wind turbine generator with converter controls for grid-forming application according to the present disclosure.

Referring now to FIG. 10, a schematic diagram of one embodiment of a system 200 for providing grid-forming control of a double-fed generator of a wind turbine according to the present disclosure is illustrated. More specifically, as shown, the system 200 may include many of the same features of FIG. 7 described herein, with components having the same reference characters representing like components. Further, as shown, the system 200 may include a control structure for controlling the line-side converter that is similar to the control structure shown in FIG. 7.

Moreover, as shown, the line-side converter control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g., a phase-locked loop angle) from a phase-locked loop 216 to generate one or more gate pulses for the line-side converter 114. The phase-locked loop 216 typically generates its output using a voltage feedback signal.

Furthermore, as shown, the system 200 may also include a control structure for controlling the rotor-side converter 112 using grid-forming characteristics. In particular, as shown in FIG. 10, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210.

In an embodiment, the grid volt/VAR regulator 202 receives a voltage reference (e.g., VT_REF) from the farm-level controller 156 and generates a stator voltage magnitude command (e.g., VS_Mag_Cmd), whereas the inertial power regulator receives a power reference from the turbine controller 26 and generates a stator voltage angle command (e.g., VS_Angle_Cmd). More specifically, in an embodiment, as shown, the stator voltage regulator 206 determines one or more rotor current commands (e.g., IRCmdy and IRCmdx) as a function of the stator voltage magnitude command, the stator voltage angle command, and/or a stator current feedback signal 240 of the double-fed generator 120. It should be understood that the stator feedback current 240 is a strong indicator of the characteristics of the externally connected power system, i.e., the grid. Therefore, the stator feedback current 240 can be used as a feedback signal to decouple the response of stator voltage to variations to the nature of the grid. Further details relating to the stator voltage regulator 206 are further explained and described in PCT/US2020/013787 entitled "System and Method for Providing Grid-Forming Control for a Doubly-Feb Wind Turbine Generator," which is incorporated herein by reference in its entirety.

Figure 11:
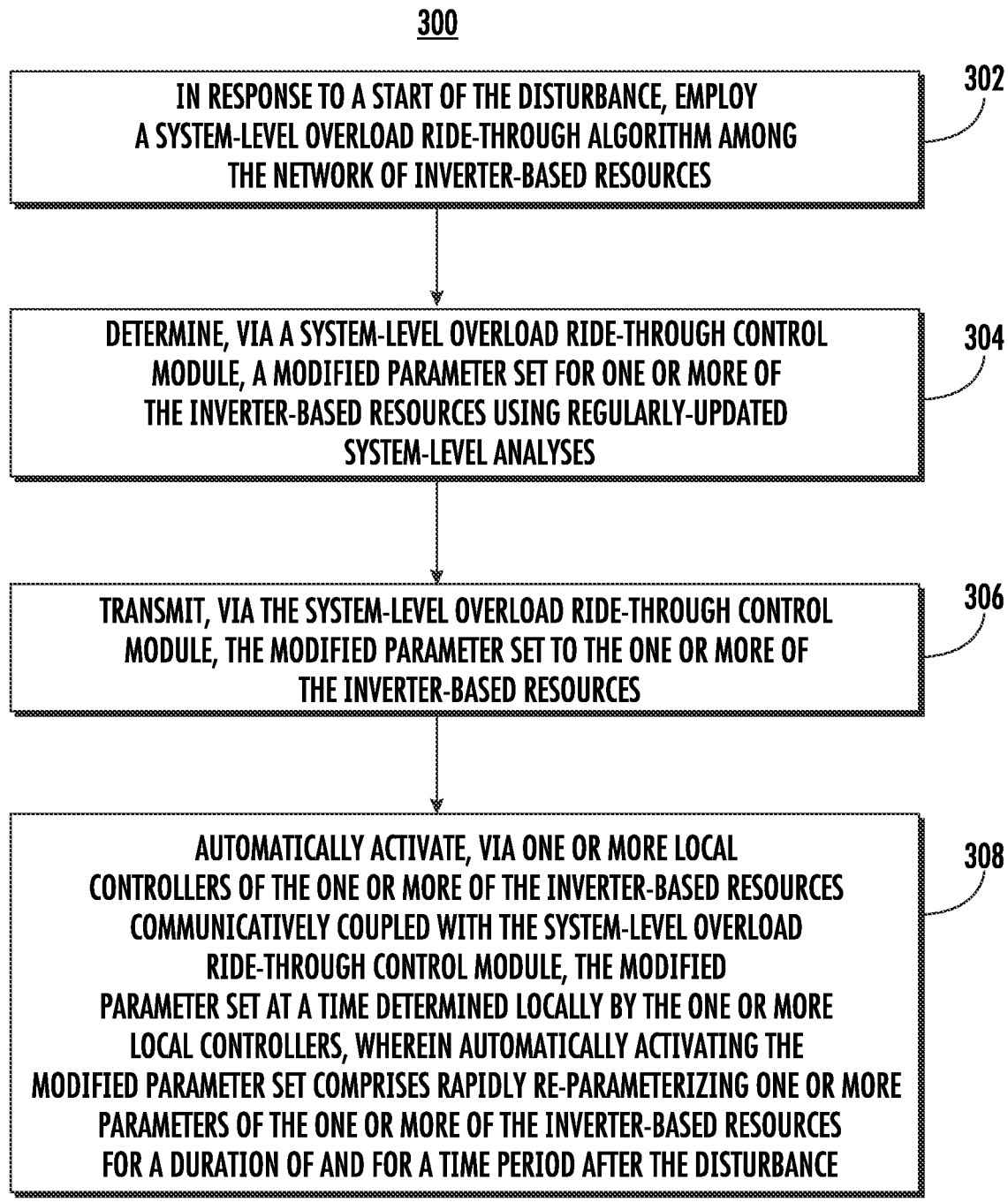
FIG. 11 illustrates a flow diagram of an embodiment of a method for controlling a network of one or more inverter-based resources connected to a power grid during a disturbance according to the present disclosure.
Figure 12:
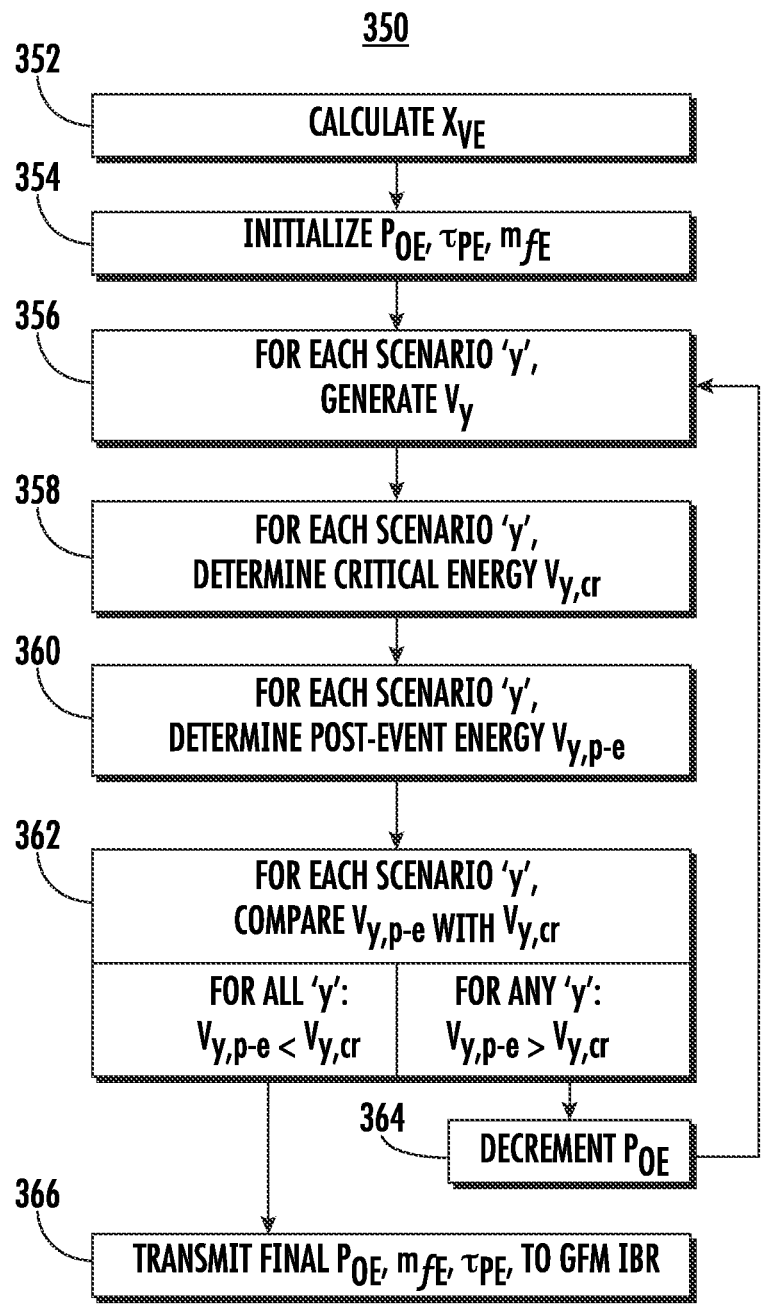
FIG. 12 illustrates a flow diagram of an embodiment of a method for controlling a network of one or more inverter-based resources connected to a power grid during a disturbance according to the present disclosure.
Figure 13:
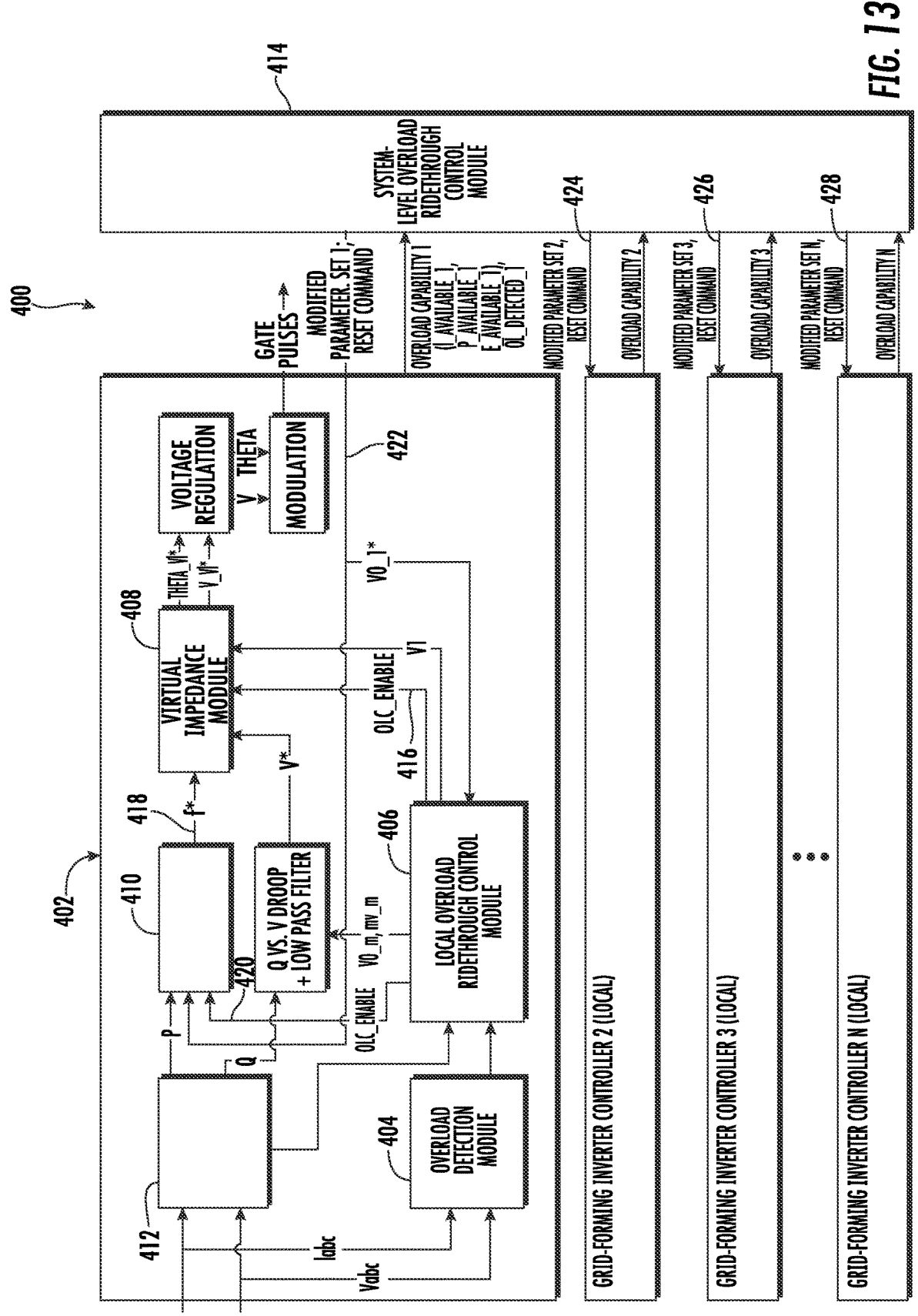
FIG. 13 illustrates a schematic diagram of an embodiment of a system for controlling a network of one or more inverter-based resources connected to a power grid during a disturbance according to the present disclosure.

Referring now to FIGS. 11-13, the present disclosure is directed to methods 300, 350 and systems 400 for controlling a network of inverter-based resources that may be connected to a power grid during a large disturbance. As used herein, a large disturbance may generally refer, but is not limited to, severe instances of the following: (1) symmetric or asymmetric line-to-ground or line-to-line fault when islanded or grid-tied, with the fault being local to the inverter or electrically distant, (2) a step-up or step-down or sag or swell in the utility grid voltage magnitude, when grid-tied, (3) a step-up or step-down in the utility grid phase angle, when grid-tied, (4) loss of a distribution or transmission line when islanded or grid-tied, (5) unexpected loss of another significant grid-forming source when islanded or grid-tied, (6) large steps in constant-power load, constant current load, constant impedance load, or machine load, or large steps in a composite that includes of any of these aforementioned load types, when islanded or grid-tied, and/or (7) large steps in load associated with an unintentional islanding event, i.e. an unintentional transition from grid-tied to islanded condition or an unintentional synchronization event, i.e. an unintentional transition from islanded to grid-tied condition, as well as any other severe grid events now or later known in the art.

Referring particularly to FIG. 11, a flow diagram of an embodiment of a method 300 for controlling a network of inverter-based resources connected to a power grid during a large disturbance according to the present disclosure is illustrated. It should be appreciated that the disclosed method 300 may be implemented with any suitable inverter-based resource having any suitable configuration. In several embodiments, for example, the inverter-based resource may be a wind turbine power system (e.g., having a full conversion power system or a dual-fed power conversion system as illustrated in FIG. 10, or dual-fed systems that regulate voltage at some other location instead of the stator, or that dual-fed systems that regulate magnetic flux or dual-fed systems that regulate the grid or stator voltage using the line-side inverter instead of the rotor-side inverter), a solar inverter, an energy storage system, a STATCOM, a hydro-power system, or any other inverter-based system mentioned herein or known in the art. In addition, although FIG. 11 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring first to FIG. 11, in response to a start of the disturbance, as shown at (302), the method 300 includes employing a system-level overload ride-through algorithm among the network of inverter-based resources. More specifically, in an embodiment, as shown at (304), the system-level overload ride-through algorithm includes determining, via a system-level overload ride-through control module, a modified parameter set for one or more of the inverter-based resources using regularly-updated system-level analyses. Further, as shown at (306), the method 300 includes transmitting, via the system-level overload ride-through control module, the modified parameter set to the one or more of the inverter-based resources. Moreover, as shown at (308), the method 300 includes automatically activating, via one or more local controllers of the one or more of the inverter-based resources communicatively coupled with the system-level overload ride-through control module, the modified parameter set at a time determined locally by the one or more local controllers. In particular embodiments, automatically activating the modified parameter set may include rapidly re-parameterizing one or more parameters of the one or more of the inverter-based resources for a duration of and for a time period after the disturbance.

Referring to FIG. 12, a flow diagram of another, detailed embodiment of a method 350 for controlling a network of inverter-based resources connected to a power grid during a large disturbance according to the present disclosure is illustrated. Similar to the method 300 of FIG. 11, it should be appreciated that the disclosed method 350 of FIG. 12 may be implemented with any suitable inverter-based resource having any suitable configuration. In several embodiments, for example, the inverter-based resource may be a wind turbine power system (e.g., having a full conversion power system or a dual-fed power conversion system as illustrated in FIG. 10, or dual-fed systems that regulate voltage at some other location instead of the stator, or that dual-fed systems that regulate magnetic flux or dual-fed systems that regulate the grid or stator voltage using the line-side inverter instead of the rotor-side inverter), a solar inverter, an energy storage system, a STATCOM, a hydro-power system, or any other inverter-based system mentioned herein or known in the art. Furthermore, in an embodiment, it should be understood that the method 350 may be implemented for a power system containing grid-forming IBRs or power system containing a mixture of grid-forming IBRs and synchronous machines-based sources. In other embodiments, in a method for controlling a network of IBRs connected to a power grid during a large disturbance, the network of controlled IBRs may be partially or wholly comprised of grid-following IBRs.

In addition, although FIG. 12 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In particular, as shown at (352), the method 350 includes calculating a modified virtual impedance, $X_{VE}$. As shown at (354), the method 350 includes initializing a modified parameter set (e.g., to include $P_{OE}$, $\tau_{PE}$, and $m_{fE}$). As shown at (356), for each scenario 'y', the method 350 includes generating a system-wide energy function, such as an Lyapunov function, $V_y$. Moreover, as shown at (358), for each scenario 'y', the method 350 includes determining a critical energy $V_{y,\,cr}$. Furthermore, as shown at (360), for each scenario 'y', the method 350 includes determining a post-even energy $V_{y,p-e}$. In addition, as shown at (362), for each scenario 'y', the method 350 includes comparing $V_{y,p-e}$ and $V_{y,\,cr}$. Thus, as shown at (364), for any 'y': $V_{y,p-e} > V_{y,\,cr}$, the method 350 includes decrementing $P_{OE}$. Further, after decrementing $P_{OE}$, the method 350 includes starting over at (356). Alternatively, as shown at (366), for any 'y': $V_{y,p-e} < V_{y,\,cr}$, the method 350 includes transmitting final values for the modified active power setpoint, $P_{OE}$, time constant, $\tau_{PE}$, and the frequency droop gain, $m_{fE}$, to the IBRs with the assumption, in this particular embodiment, that all of the IBRs in the network are grid-forming.

Figure 3:
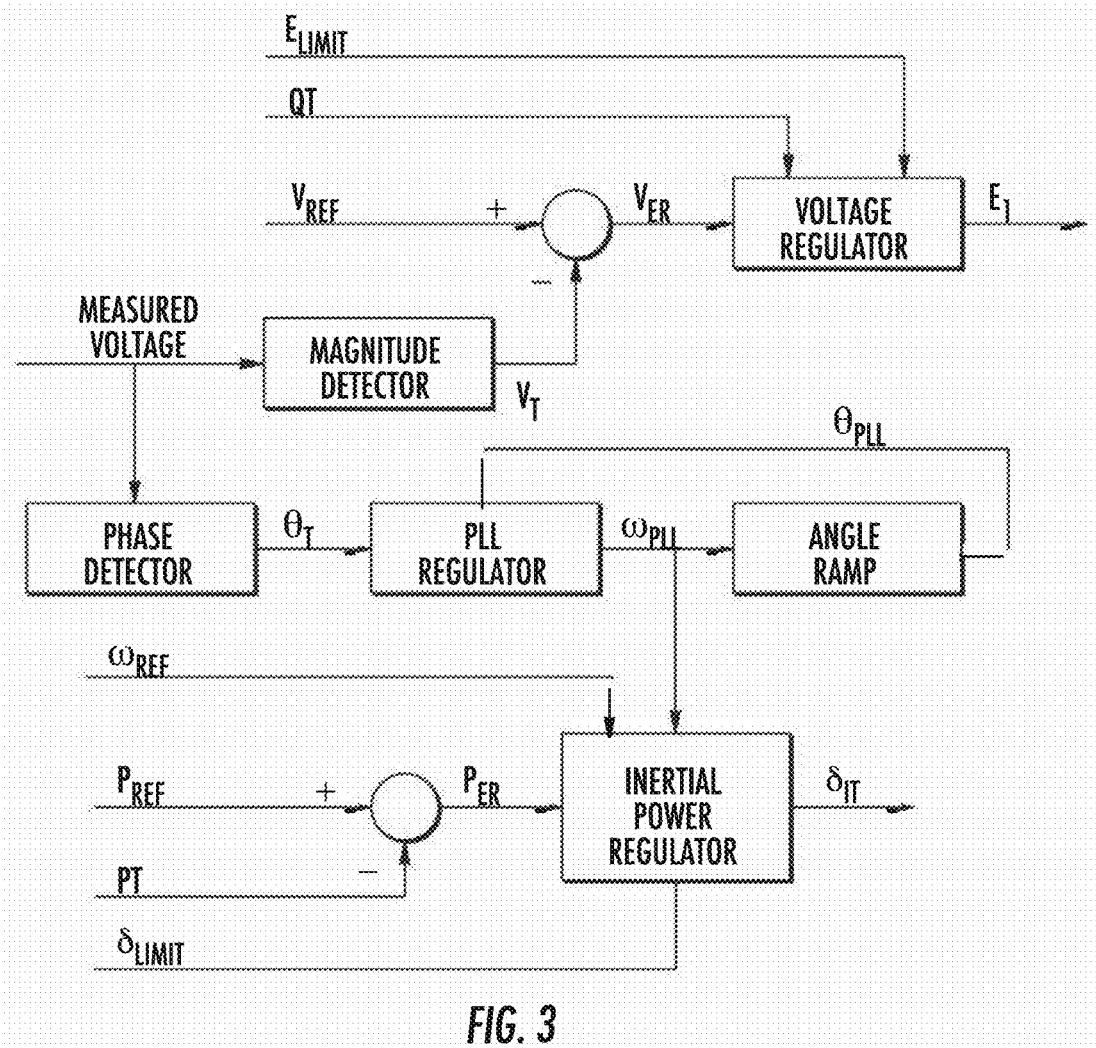
FIG. 3 illustrates a schematic diagram of one embodiment of power and voltage control of a grid-connected grid-forming inverter-based resource according to conventional construction.

Furthermore, in the embodiment shown in FIG. 12, it is assumed that effective virtual inertia parameter of the grid-forming IBRs is calculated by dividing the modified power measurement time constant $\tau_{PE}$ by the modified frequency droop gain, and that the effective virtual damping parameter of the grid-forming IBR is inversely proportional to the modified frequency droop gain, $m_{fE}$, where the virtual inertia parameter is multiplied by the measured active power of the grid-forming IBR to determine the rate-of-change of the commanded frequency, and the virtual damping parameter is multiplied by the change in commanded frequency to determine an offset to subtract from the active power dispatch, consistent with typical implementations of the inertial power regulator shown in FIG. 3.

Alternatively, in another embodiment, a modified virtual inertia parameter and modified virtual damping parameter may be transmitted to the grid-forming IBR instead of transmitting a modified time constant $\tau_{PE}$ and a modified frequency droop gain, $m_{fE}$. In the case that some or all of the IBRs in the network are grid-following, virtual inertia and virtual damping parameters (instead of time constant $\tau_{PE}$, and frequency droop gain, $m_{fE}$) may be transmitted to a grid-following IBR, where virtual inertia parameter for the grid-following IBR determines the commanded magnitude of active power injection based on a measured rate-of-change-of-frequency and virtual damping parameter determines the commanded magnitude of active power injection based on a measured change in frequency. In some embodiment, in the case that synchronous machine-based resources are also present in the same power grid that contains the IBRs, all steps in the methods described herein, including, for example, (356), (358), and (360), may include appropriate representation of the actual inertia, damping, impedance, and power dispatch of those synchronous machines-based resources in any equations and calculations, as necessary.

The methods 300, 350 and the overload ride through control system 400 of the present disclosure can be better understood with respect to FIGS. 13-18. In particular, as shown in FIG. 13, the system 400 may include a local controller 402 for one or more of the IBRs. Thus, as shown, the local controller(s) 402 may generally have an overload detection module 404, a local overload ride-through control module 406, a virtual impedance module 408, a P versus f Droop+Virtual Inertia module 410, an active/reactive power calculation module 412, and a system-level overload ride-through control module 414, which are further explained and described herein below.

In such embodiments, the overload detection module 404 within the local IBR controller 402 is configured to rapidly detect one or more types of overload conditions, including but not limited to an overcurrent, overpower (e.g., active power and/or reactive power overload), and/or overload condition, experienced by the IBR. Alternatively, the overload detection module 404 may detect a severe grid event that has not yet resulted in overload, but which has a high probability of resulting in an overload condition if no control action is immediately taken. As used herein, an overload condition is generally defined as a condition in which a threshold has been surpassed for a variable of interest (e.g., current, active power, reactive power, or energy produced or absorbed by the IBR), and the IBR will trip offline if that variable remains above that threshold for any significant amount of time. Generally, the time of activation of the modified parameter set corresponds to the instant of time at which the local controller 402 associated with that IBR detects an overload or severe grid event, which is likely to be in the initial moments of a sufficiently-severe grid event. Thresholds can be determined in an online manner by the overload detection module 404 and updated occasionally depending upon the operating conditions (e.g., solar irradiance).

In an embodiment, for example, a current threshold of the IBR may be given by the maximum continuous current rating of the IBR. Further, an instantaneous active power threshold of the IBR may be computed by summing the estimated active power capability of the IBRs connected to the dc bus at that moment in time (e.g., the sum of PV panel maximum power point plus the battery energy storage SOF plus the ultracapacitor SOF, if these sources are present). An energy threshold may be computed by summing the estimated energy of the IBRs connected to the dc bus at that moment in time, including energy stored within any dc bus capacitance internal to the IBR or shared between the IBRs (e.g., the energy stored in the IBR's dc bus capacitance, inertia of the rotor blades, rotor inertia of the generator connected to the dc bus, ultracapacitor energy availability, battery energy storage energy availability, etc.).

Still referring to FIG. 13, the local overload ride-through control module 406 is configured to activate that IBR's modified parameter set within the local controller 402 once an overload or severe grid event has been detected by the overload detection module 404. Upon detecting an overload or a severe grid event that will likely result in an overload, the IBR(s) is configured to use its local overload ride-through control module 406 to immediately and re-parameterize its local frequency, voltage and virtual impedance control functions using the values included in its modified parameter set (the latest set that was previously transmitted from a system-level overload ride-through control module). Under such circumstances, all parameters in the modified parameter set simultaneously replace their counterparts in the nominal parameter set. If no overload or severe event is detected by that IBR, the nominal operating parameters continue to be used. The local controller 402 distributes the various modified parameters within the modified parameter set to appropriate submodules, or sends a signal to the other submodules to activate the modified parameters that have already been distributed to the submodules.

Still referring to FIG. 13, the virtual impedance module 408 is configured to cause a virtual impedance to be emulated at the terminals of the IBR. This virtual impedance will be used for limiting the output of the IBR, and its activation achieves or more of the following functions: current limiting, active power limiting, reactive power limiting, and energy limiting. Further, in an embodiment, the emulated virtual impedance has a high X/R ratio, to justify the use of energy-based stability analyses by the system-level overload ride-through control module 414.

If the virtual impedance module 408 receives an OLC_enable signal 416 set to '1', the module 408 produces current-dependent offsets in the voltage magnitude and angle of the IBR terminals. The terminal voltage drop and angle offset produced in this manner would appear similar to that which would occur an if actual impedance with a fixed real and imaginary part were to be placed in series with the IBR terminals. In contrast, if the virtual impedance module 408 receives an OLC_enable signal 416 set to '0', the voltage magnitude and angle offset are ramped back to their original values. In typical embodiments, such as in the case that the IBRs in the network are grid-forming, the virtual impedance module can calculate a voltage drop based on the measured output current of the IBR. In other embodiments, in the case, for example, that one or more IBRs are grid-following, the virtual impedance module within a grid-following IBR can calculate an offset in a current command depending upon the locally-measured grid voltage.

In an embodiment, the P versus f Droop+Virtual Inertia module 410 may receive the instantaneous active power P from the active/reactive power calculation module, which may be filtered using a single pole low-pass filter with time constant Tau_P to create filtered signal Pf. Thus, as shown, the P versus f Droop+Virtual Inertia module 410 outputs a frequency f* 418, which may be calculated according to the filtered active power as follows: f*=f_0+m_f*(P_0−Pf), where P_0 is the active power dispatch setpoint, f_0 is the frequency setpoint, m_f is the frequency droop gain. Voltage droop as a function of reactive power measurement may or may not be employed. If the P versus f Droop+Virtual Inertia module 410 receives an OLC_enable signal 420 set to '1, the module 410 sets P_0, m_f, Tau_P to their modified values. In contrast, if the P versus f Droop+Virtual Inertia module 410 receives an OLC_enable signal 420 set to '0', the module ramps P_0, m_f, Tau_P back to their original values.

Referring still to FIG. 13, the system-level overload ride-through control module 414 may reside at the supervisory level and may be configured to determine and distribute the modified parameter sets 422, 424, 426, 428, and so on for each of the IBRs within its jurisdiction (including at least one IBR, and possibly including an arbitrary number of IBRs). More specifically, in an embodiment, the system-level overload ride-through control module 414 is configured to transmit the modified parameter set (e.g., labeled as 422, 424, 426, 428) and any other relevant information (such as a parameter reset command signal) via a communication link therefrom to the various local IBRs. In such embodiments, the communication link may be fiber, wireless, and/or wired communication hardware). Additionally, using this communication link, IBR-specific current, transient power, and transient energy capabilities are communicated from each IBR to the system-level overload ride-through control module 414.

The modified parameter set(s) 422, 424, 426, 428 issued by the system-level overload ride-through control module 414 to each IBR may include, for example, one or more of the following control parameters: a modified active power dispatch setpoint, P_0, a modified reactive power dispatch setpoint, Q_0, a modified virtual damping parameter (or frequency droop slope parameter), a modified filter time constant or virtual inertia parameter, a virtual reactance to be used for overload limiting, a voltage magnitude reference setpoint, or any other suitable control parameter. For each IBR, these modified parameters serve as substitutes to the regular control parameters in the event that the overload detection module 404 detects an overload or severe grid event.

At regular intervals, the system-level overload ride-through control module 414 executes a system-level analysis to determine the modified parameter set(s) 422, 424, 426, 428 that each IBR will use in the event that the overload detection module 404 within that IBR detects an overload or severe grid event. For example, in an embodiment, the online analysis may be an iterative algorithm as described herein below, comprised of several steps to be executed consecutively:

More specifically, in an embodiment, for each IBR, the virtual reactance used in a current or active power overload condition may be set to a value determined by the maximum continuous current rating of the IBR in consideration of the most stringent ride-through requirements (e.g., a phase jump requirement). For example, in an embodiment, the worst-case phase jump requirement may be 180 degrees, and in this case the virtual reactance should be initialized to a value of 2 per-unit so that the IBR would be current-limited to a maximum of 1 per-unit. In such embodiments, a 2 per-unit virtual reactance ensures up to 0.5 per-unit reactive power injection into a bolted three phase fault at the IBR terminals.

In certain embodiments, a IBR may address a transient energy overload event by first using a larger overload virtual reactance than that described above. This overload virtual reactance is sufficiently large to effectively eliminate active power transfer to or from the grid. If the energy reserve of that IBR becomes depleted or completely full during a grid event, that IBR would have to activate this overload virtual reactance to eliminate transfer of active power to or from the grid long enough to use internal mechanisms to charge or discharge its energy reserve back to 50% State of Charge (SOC). Once the energy reserve returns to 50% SOC, the larger virtual reactance can either be gradually removed or switched to the nominal value of virtual reactance used for current or active power overloads until synchronization is achieved. Once synchronization is achieved, the system-level overload ride-through control module 414 can send a reset signal to deactivate the virtual reactance.

For each IBR, the modified active power setpoint, P_0, may be initialized at a value equal to the lowest of the following three values: (a) the active power capability of the IBR, (b) the estimated maximum active power that can possibly be transmitted through the virtual reactance selected for that IBR in the post-event scenario, and/or (c) the desired value of active power injection during (and in the several seconds immediately following) severe grid events.

In such embodiments, the active power capability of the IBR is generally defined as the combined available active power of the dc bus generation, if extant, summed with the active power capability of any supplemental energy storage source connected to the dc bus. For example, in an embodiment, the active power capability may be the power presently available from dc-coupled solar PV plus the power rating of the supplemental dc-coupled energy storage source on the dc bus, assuming that the IBR itself is capable of handling the combined active power of the dc bus source and supplemental energy storage reserve.

In the case that the infinite bus is present within the system 400 (i.e., the system 400 was tied to the bulk power system prior to the event and does not become islanded during the grid event, or the system 400 becomes grid-connected during the grid event), the maximum active power that can be transmitted is approximately equal to $P0=V^2/X$, where X is the virtual reactance described above and V is the nominal grid voltage magnitude). In the case that the bulk power system (infinite bus) is not present in the post-event system, the maximum active power that can be transmitted may be a function of the virtual reactances used by other IBRs for current limiting.

For each IBR, the modified virtual inertia (or power measurement filter time constant) may be set at a value determined by the amount of energy storage available to that IBR. In such embodiments, it is assumed that the energy storage reserve is initially at 50% SOC prior to the grid event. For example, if the IBR fully depletes its energy storage reserve from 50% to 0% (or fills its energy reserve from 50% to 100%) after outputting active power equal to its modified active power setpoint for a certain time period (e.g., 2 seconds), the virtual inertia may be programmed such that energy presented to the grid during the worst-case expected rate of change of frequency (ROCOF) event completely depletes this internal energy reserve. This worst-case ROCOF may include both a magnitude of ROCOF (e.g., 1 Hz/second (s)) and a duration of the event over which the ROCOF magnitude is held constant (e.g., 2 s).

Moreover, for each IBR, the modified virtual damping may be decreased by a substantial factor (e.g., 3×) relative to its nominal value, to make the damping negligible in comparison to the virtual inertia. It should generally be understood that for some control structures, decreasing the virtual damping by a substantial factor, such as 3×, may be equivalent to increasing the frequency droop gain by the substantial factor.

Furthermore, in an embodiment, a set of contingencies and post-event scenarios may be identified. Contingencies may include any of the events described herein with respect to sever grid events. For example, in an embodiment, a contingency may be a bolted phase-to-ground fault at the infinite bus or a phase angle jump, e.g., of about 30 degrees. In another embodiment, a post-event scenario may be a post-event system identical to the pre-fault system. In further embodiments, still another post-event scenario may include an alternative network topology in which one or more sources (including the infinite bus) have disconnected from the network and are no longer present in the system 400.

In certain embodiments, a system-wide energy function, such as an Lyapunov function, may be generated for each post-event scenario. In such embodiments, the system-wide energy function 'V' may include a 'kinetic energy' (KE) function summed with a 'potential energy' (PE) function (V=KE+PE). Moreover, it should be understood that the system-wide energy function may be generated as a function of relevant IBR control parameters, and any relevant parameters associated with the control or behavior of other resources in the system, possibly including synchronous machine-based resources.

Moreover, in an embodiment, the critical system energy, V_cr, may be determined, for one or more post-event scenarios. In such embodiments, the V_cr is defined as the maximum permitted post-event 'potential energy' of the system 400. If the energy of the system 400 can be maintained below this value, large-signal stability of the system 400 can be assured. In such embodiments, each post-event scenario may have a distinct V_cr. Further, it can be assumed that all IBRs that are still connected in the post-event system will still have their respective virtual reactances activated in post-event condition, and that the virtual reactance dwarfs the parasitic network reactances.

Figure 14:
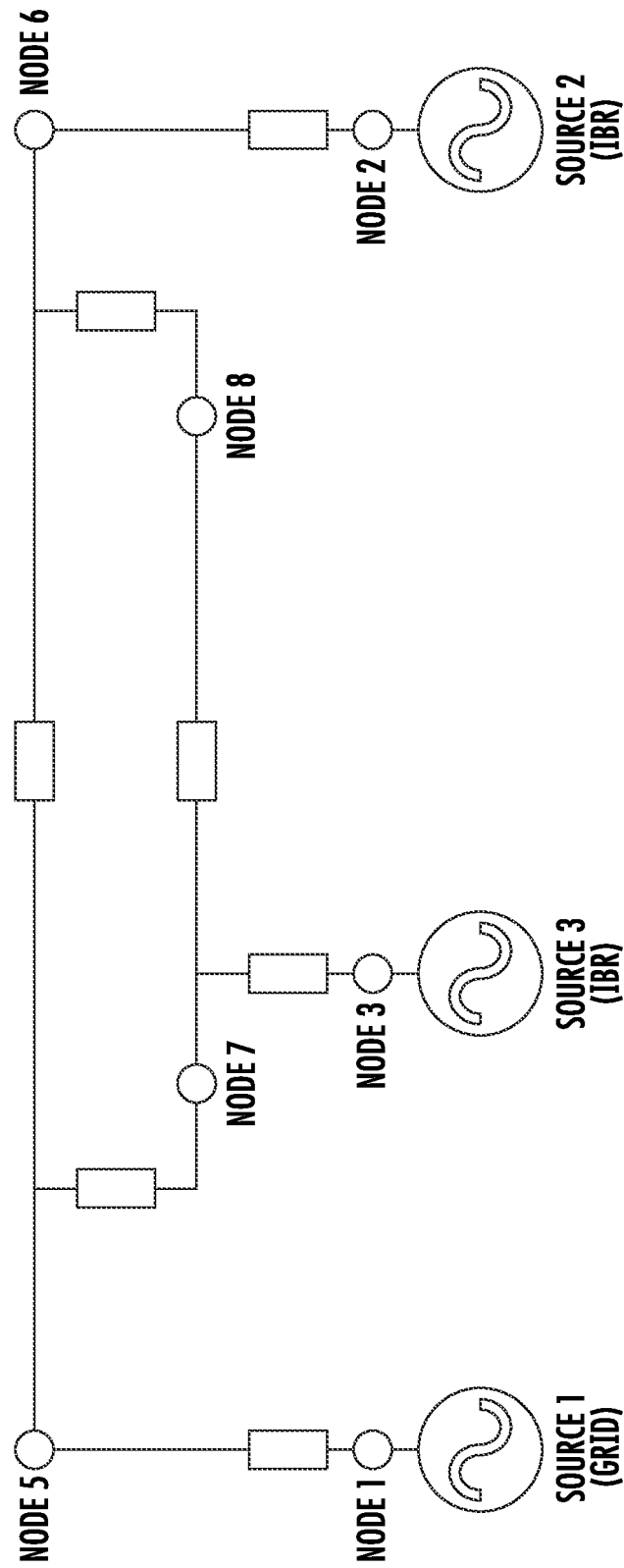
FIG. 14 illustrates a simplified, schematic diagram of an embodiment of a three-source system according to the present disclosure.
Figure 15:
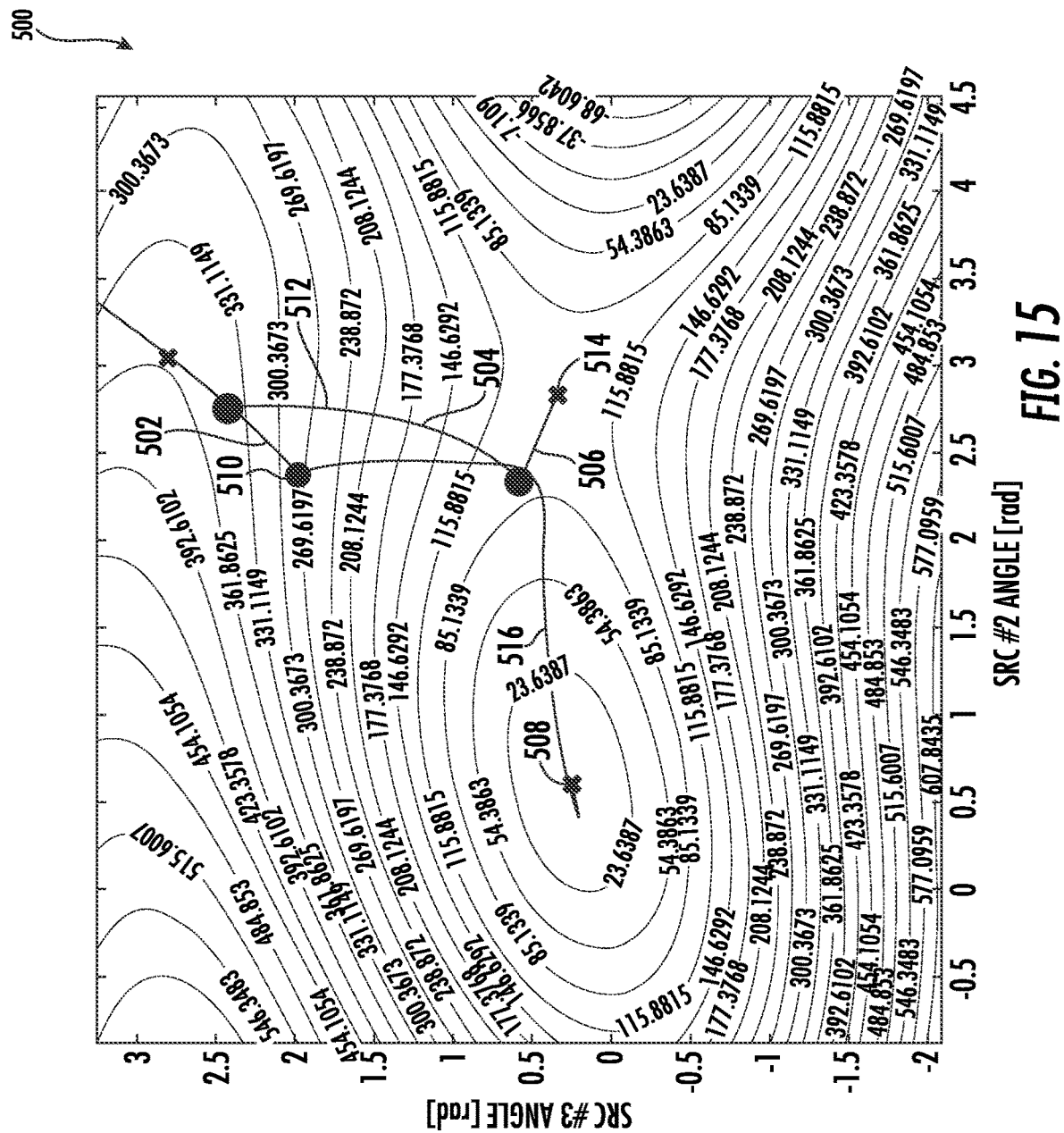
FIG. 15 illustrates a topographical map of an embodiment of a potential energy (PE) surface used in a multi-step calculation of the controlling unstable equilibrium point for the three-source system of FIG. 13.

In additional embodiments, the V_cr for a given post-event scenario may be determined by the value of the PE function at the controlling unstable equilibrium point. In order to determine the critical energy V_cr, it is necessary to determine the set of IBR angles corresponding to the controlling unstable equilibrium point (CUEP). For example, FIG. 14 illustrates an example three-source system, whereas FIG. 15 illustrates a topographical map 500 of the potential energy (PE) surface used in the multi-step calculation of the CUEP for the three-source system in FIG. 14. More specifically, as shown in FIG. 15, the post-fault potential energy surface of the three-source system is plotted as a function of inverter angle relative to the infinite bus. This potential energy surface may be computed using the potential energy component of the system-wide energy function. Since the potential energy is a function of grid voltage magnitude, inverter power dispatch, L-C-L filter and network reactances, and the magnitudes of virtual reactance used by the IBR for overcurrent limiting, this surface can change substantially as a function of the system condition. In the case of FIG. 15, the potential energy surface is plotted for the post-event condition, in the case that the grid voltage is restored to 1.0 per-unit following the clearing a fault in which the grid voltage had declined to 0.2 per-unit.

Accordingly, the calculation of the CUEP may be executed in three steps, including: (1) numerical integration of grid event dynamics until the ridgeline of the PE surface is crossed (e.g., line 502), (2) tracing of the gradient of the PE function along the ridgeline of the PE surface to determine an acceptable initial starting point for the homotopy method (e.g., line 504), and (3) application of the homotopy method to precisely locate the UEP (e.g., line 506). In addition, FIG. 15 further demonstrates the use of a power flow analysis for the determination of the stable equilibrium point 508, a second power flow analysis to determine initial conditions used for numerical integration 510, numerical integration of the event dynamics 502, tracing of the gradient of the PE surface 512, and use of the homotopy analysis method 506 (described in more detail herein) to determine the controlling unstable equilibrium point 514. Moreover, as shown, line 516 demonstrates the trajectory of the system during a hypothetical grid event.

While the potential energy surface can be easily visualized if there are only two IBRs (as shown in FIG. 14), it should be understood that this procedure can be generalizable to an arbitrary number of IBRs (from one to 'n'), in which case the PE function describes a surface of arbitrary dimension in hyperspace. Once the CUEP is found, the potential energy at that point can be calculated using the PE function.

In the context of contingencies and post-event scenarios identified herein, each set of contingencies may be is investigated for each post-event scenario. Thus, in an embodiment, for each contingency, post-event total system energy can be calculated. For each post-event scenario associated with a given contingency, a determination is made on whether V_cr is exceeded (and synchronism potentially lost) at the beginning for a range of expected clearing times, for any of the contingencies. For example, the clearing time may be the time required for a protection device(s) to clear a fault. In an embodiment, in the case of a phase angle step contingency, the post-event system may begin at the instant of the step and the clearing time is zero. To investigate, numerical integration for the dynamics of the IBRs from the event start time to the clearing time may be computed, for example, using a simplified reduced-order system of the electromechanical dynamics, as set forth below and labeled as Equations (5). Thus, at the clearing time, the final set of IBR angles may be used to calculate the total system energy (TSE) of the post-event system, using the PE function.

$$\dot{\omega} = M^{-1}(L_1(P_I - P_N(\delta, V)) - D\omega)$$

$$L_1 \dot{\delta} = \omega$$

$$0 = L_2(P_I - P_N(\delta, V))$$

$$0 = Q_L(V) - Q_{N,L}(\delta, V) \qquad \text{Equations (5)}$$

where:

$$\omega \in \square^m := \text{diag}(m_f)(P_0 - P_f)$$

$$D \in \square^{m \times m} := [\text{diag}(m_f)]^{-1}$$

$$M \in \square^{m \times m} := \text{diag}(\tau_P)[\text{diag}(m_f)]^{-1}$$

$$P_N \in \square^n = A \, \text{diag}(bl)\text{diag}(e^{|A|^T \ln(V)})\sin(A^T \delta)$$

$$P_I \in \square^n := [P_0^T, P_L^T]^T$$

$Q_{N,L} \in \mathbb{L}^n := [\text{diag}(V_L)]^{-1} L_2 |A| \text{diag}(bl) \text{diag}(\exp(|A|^T \ln(V))) \cos(A^T \delta)$ $L_1 \in \mathbb{L}^{m \times n} :=$ rows 1 through $m$ of an $n \times n$ identity matrix.

$L_2 \in \mathbb{L}^{(n-m) \times n} :=$ rows $m+1$ through $n$ of an $n \times n$ identity matrix.

If V_cr is exceeded by the TSE in the initial moments of the post-event system, the absolute value of the modified power dispatch levels P_0_m for each IBR may be incrementally reduced. In addition, the numerical integration described herein above may be repeated. Furthermore, in an embodiment, such steps may be repeated until V_cr is not exceeded for this combination of contingency and post-event scenario. In alternative embodiments, if V_cr is not exceeded by the TSE, but the energy reserve of any of the IBRs is exceeded during the grid event, the system 400 is configured to incrementally reduce the virtual inertia or virtual damping of that IBR and repeat the numerical integration described herein above for this combination of contingency and post-event scenario.

Once all contingencies have been evaluated for each post-event scenario, and V_cr and energy limits have not been exceeded for any contingency and post event scenario, the modified parameter sets can be issued by the system-level overload ride through module 414 to the various IBRs to be used in the case of a contingency.

In particular embodiments, contingencies can optionally include simultaneous or staggered application of virtual reactance by two or more IBRs. Furthermore, in an embodiment, contingencies may also include temporary loss of a IBR due to an overload event for that IBR. In particular embodiments, coherency may be assumed for the IBRS which do not activate their virtual reactance.

In the case that overload protection has been triggered by any of the IBRs under the jurisdiction of the system-level overload ride-through module 414, the system-level overload ride-through module 414 is configured to monitor the grid conditions to determine when it is safe for the IBR(s) to disactivate their respective virtual reactances. For example, the system-level overload ride-through module 414 may decide that it is safe for the IBRs to remove their respective virtual reactance once the voltage and frequency (as measured by the system-level overload ride-through module 414 or individual local overload ride through control modules 406) have remained within reasonable bounds for a specified time period and the IBRs are thereby estimated to have reached a stable dynamic equilibrium. The system-level overload ride-through module 414 can then send a reset signal to the IBR(s) such that each IBR can each gradually return to their nominal control values.

In such embodiments, the following control parameters and setpoints can be changed simultaneously for a given IBR: (1) the virtual reactance can ideally be removed in such a manner as to reduce the potential for any dynamic transient, (2) the active power measurement filter time constant/virtual inertia can be stepped back to its nominal value, (3) frequency droop gain/virtual damping may be stepped back to its nominal value, and (4) the active power setpoint may be stepped back to its pre-event value, or a new desired active power setpoint. In such embodiments, the IBR will smoothly ramp up to this active power setpoint. It should also be understood that the inertial active power injection is a function of the rate of change of frequency. Thus, since the system 400 is in stable equilibrium and the frequency is constant, there will be no active power transient as a result of step-change in virtual inertia. Moreover, the damping active power injection is a function of frequency deviation. As such, if the steady-state post-event system frequency has deviated significantly from the pre-event system frequency, the step in frequency droop gain can be executed simultaneously with a step change in frequency setpoint, if desired, in order to eliminate any change in active power injection.

Upon any change in generated active power (e.g., a change in solar irradiance or wind speed) or network conditions (e.g., an IBR is determined to have been disconnected from the network), the aforementioned process may be repeated by the system-level overload ride-through module 414, including the generation of a system-wide energy function, such as a Lyapunov function, the calculation of V_cr, and the contingency analysis. Thus, in such embodiments, a new modified parameter set can be issued by the system-level overload ride-through module 414 once the analysis is complete.

As such, the methods and systems of the present disclosure are intended to serve as a holistic system-level overload ride-through strategy that addresses self-protection, stability and optimality of the IBRs. In particular, self-protection is achieved by the use of virtual impedance for immediate limitation of current, active power, or energy if any of these values crosses a pre-defined threshold. Active power and current limitations are addressed via activation of a nominal virtual reactance value. Energy limitations, in contrast, can be handled as follows: (i) unexpected energy limitations not addressed by the contingency analysis described herein can be addressed using a larger virtual reactance to eliminate all grid active power transfer and allow for recharge or discharge of the energy reserve, followed by either a gradual deactivation of the virtual reactance or step-down in virtual reactance magnitude to a value that will allow for stable synchronization; (ii) in the case of overload events precipitated by the triggering of virtual reactance by one or more IBR, energy limitation can be prevented by examining the possibility of this happening in the contingency analysis described herein and appropriately reducing the virtual inertia of one or more sources. The reduction of virtual damping simplifies the control approach, since damping power will not have to be accounted for in determining whether the transient active power or transient energy might exceed a threshold.

With respect to stability, for all of the evaluated contingencies and post-event scenarios, convergence of all the IBRs to a stable synchronous equilibrium is assured by this strategy, since the total system energy does not exceed V_cr. As the system-wide energy function analysis used to provide this assurance applies to nonlinear systems, the aforementioned stability guarantee is valid even for very large disturbances that are outside the scope of traditional small-signal stability analysis. Reduction of virtual damping during the transient ensures the applicability of the system-wide energy function approach.

With respect to optimality, the present disclosure allows for an uninterrupted injection of user-specified active and reactive power to support the grid during any type of severe grid event. Further, the contingency analysis described herein provide for optimality by allowing for active and reactive power injection during or after a severe grid event to the extent possible.

In further embodiments, the system-level overload ride-through module 414 may be a centralized controller, or multiple modules distributed among the various IBRs. In the latter case, the IBRs may perform the analyses required to determine the modified parameter sets for each IBR.

The reduced-order modeling of an inverter network and system-wide energy function analysis will now be described in more detail. In particular, the slow-timescale (i.e., >100 ms) nonlinear dynamics of an unreduced power system containing an arbitrary number of IBRs and/or synchronous machines, (optionally including the infinite bus, as in the system in FIG. 14) can be modeled using a compact set of vector-valued, nonlinear differential-algebraic equations as set forth above with respect to Equations (5).

In such an embodiment, the network has m sources (including IBRs and the infinite bus, if extant), and one or more transmission line. The network has n nodes, including source nodes and PQ nodes. Nodes 1 to m of the network are defined as source nodes. Source nodes correspond either to the infinite bus (if extant) or the hypothetical node associated with the internal voltage of an IBR. The internal voltage of an IBR is defined as the voltage behind any virtual impedance (i.e., the voltage at the terminals of the inverter if no virtual impedance is applied). Nodes m+1 to n correspond to PQ (load bus) nodes. V represents the node voltage magnitudes, $V_L$ represents the PQ-node voltage magnitudes, $\delta$ represents the node voltage angles relative to a reference frame rotating synchronously with the frequency of the system, A represents the network adjacency matrix of the unreduced network admittance matrix Y, and bl represents a vector of susceptances associated with this unreduced network. $P_0$ represents a vector of inverter active power dispatch setpoints, $m_f$ represents a vector of inverter controller P-f droop slopes, $\tau_P$ represents a vector of inverter controller power filter time constants (with $P_f$ representing filtered active power), and $P_L$ represents active power of the loads at the PQ nodes.

Moreover, as represented by Equations (5), a focus is made on the control-related dynamic interactions between IBRs and (possibly) an infinite bus. Electromagnetic dynamics of the network, including, for example, transformer leakage inductance, inverter line filters, and parasitic inductance of the distribution system, are assumed to decay at an infinitely fast rate, and are thereby represented as algebraic constraints. For common grid-forming control structures, this time scale separation-based order reduction can typically be rigorously justified for IBR networks through a singular perturbation argument. Virtual inertia and virtual damping inherently present within well-known grid-forming control structures are explicitly represented by M and D, respectively. Further, as represented by Equations (5), the network may not necessarily Kron-reduced: i.e., the structure of the network may be preserved and load nodes such as Nodes 5-7 in FIG. 14 are fully represented. An arbitrary number of IBRs, and arbitrary network connections (including mesh, radial, and combinations) can be represented by Equations (5).

In further embodiments, the system-wide energy function, such as the Lyapunov function, for Equations (5) may be motivated by the concept of physical energy traditionally associated with inertia and damping terms M and D in Equations (5). Thus, a Lyapunov function candidate for Equations (5) may be given by Equation (6) below:

$$V = \sum_{i=1}^{n} \frac{1}{2}\left(\frac{\tau_{vr,i}}{m_{fvr,i}}\omega_i^2\right) - \sum_{i=1}^{n}\left(P_{0vr,i} - E_i^2 G_{vr,ii}\right)[\delta_i - \delta_i^s] - \sum_{i=1}^{n-1}\sum_{j=i+1}^{n}\left[E_i E_j B_{vr,ij}\left(\cos\delta_{ij} - \cos\delta_{ij}^s\right)\right] \quad \text{Equation (6)}$$

with a kinetic energy term $V_{KE}$ represented by Equation (7) below:

$$V_{KE} = \sum_{i=1}^{n} \frac{1}{2}\left(\frac{\tau_{vr,i}}{m_{vrf,i}}\omega_i^2\right) \quad \text{Equation (7)}$$

and a potential energy term $V_{PE}$ represented by Equation (8) below:

$$V_{PE} = -\sum_{i=1}^{n}\left(P_{0vr,i} - E_i^2 G_{vr,ii}\right)[\delta_i - \delta_i^s] - \sum_{i=1}^{n-1}\sum_{j=i+1}^{n}\left[E_i E_j B_{vr,ij}\left(\cos\delta_{ij} - \cos\delta_{ij}^s\right)\right] \quad \text{Equation (8)}$$

In Equations (5)-(8), $B_{vr}$ is the Kron-reduced network susceptance matrix corresponding to a contingency in which one or more virtual reactances have been enabled for overload ride-through, and $P_{0vr}$, $\tau_{vr}$, and $m_{fvr,i}$ represent vectors of modified active power dispatch setpoints, low-pass filter time constants, and frequency droop gains, respectively. The aforementioned setpoints and control variables are stepped to pre-determined contingency values upon detection of overload by an IBR, held constant during the event, and then stepped back to their nominal values upon detection of stable post-event equilibrium.

Element $B_{vr,ij}$ of $B_{vr}$ represents the susceptance of the line between source i and source j and $G_{vr,ii}$ represents the conductance of the effective load at the terminals of the inverter i after Kron reduction. In such embodiments, it is possible to prove that Equation (6) is a useful Lyapunov function candidate, i.e., that for a region of operation, Equation (6) satisfies the required condition of positive-definiteness, V)t)>0, and that a time derivative thereof satisfies the condition of negative-semidefiniteness, $$\frac{dV(t)}{dt} \leq 0.$$

In further embodiments, it should be understood that Equation (6) is proposed in the context of the model represented by Equations (5), and inherits all simplifying assumptions associated with Equations (5). Among the most significant of these assumptions is that transfer conductances may be negligible. This assumption is not always correct in the case of Kron-reduced networks, even in the case of high network X/R ratios. Neglecting the presence of loads, it should be noted that Equations (5) and 6) are to be employed in the analysis of the post-event condition, in which the system 400 has recovered and the virtual reactances employed by the local controller(s) 402 can greatly exceed the parasitic distribution line reactances and resistances, as well as transformer leakage inductances within the network. If the series reactance of an IBR's L-C-L or L-C filter inductance is non-negligible compared to its virtual reactance, it may be accommodated for by adding it to the virtual reactances. Since the virtual reactance is assumed to dwarf the network reactance and resistance, a 'virtual star' unreduced network topology exists, which can be Kron-reduced and utilized in a Lyapunov function or power flow calculation.

In additional embodiments, the system 400 is configured to determine the CUEP and the associated potential energy. In such embodiments, T e represents the time of initiation of the grid event (e.g., the time at which a fault occurs), T ec represents the time at which the grid event or disturbance is over (e.g., the time at which a fault is cleared). As in traditional power system transient stability analysis, 'post-event' generally refers to the time period following the end of the grid event (e.g., the clearing of a fault), and 'post-event condition' refers to the condition of the system when t>$T_{ec}$. Further, $$\begin{bmatrix} \omega^s \\ \delta^s \end{bmatrix} \in \Box^{2n},$$

where $\omega^s \in \Box^n$ and $\delta_s \in \Box^n$, denotes the stable post-event equilibrium point of Equations (5). Likewise, $$\begin{bmatrix} \omega^u \\ \delta^u \end{bmatrix}$$

$\in \Box^{2n}$ denotes a post-event CUEP of Equations (5).

Accordingly, the system 400 is configured to determine $$\begin{bmatrix} \omega^u \\ \delta^u \end{bmatrix}.$$

In particular, the frequency states are a zero vector at the unstable equilibrium operating point: $\omega^u (\in \Box^n)=0$. Therefore, the following steps focus solely on the determination of the angle states at the post-event controlling unstable operating point ($\delta^u$). The n-dimensional potential energy surface defined by $V_{PE}(g)$ will be exploited for the purpose of solving for $\delta^u$. Even if alternative system-wide energy functions besides Equation (6) are ultimately employed for stability analysis, it may still be practical to employ the potential energy component of the Lyapunov function Equation (6) to determine the controlling unstable equilibrium point, as described below.

For the post-event scenario, the system 400 may determine a post-event susceptance matrix, including virtual reactances and perform a Kron reduction to determine the reduced susceptance matrix, which can be used in the energy function to calculate the total system energy and the potential energy. To determine the adjacency matrix and susceptance vector, the system 400 is configured to use Y=G+jB to represent the unreduced admittance matrix corresponding to the post-event scenario and contingency under consideration. The contingency, by definition, requires that virtual reactance is activated for one or more IBRs. Therefore, elements of B are necessarily augmented to accommodate one or more virtual reactances.

The reduced susceptance matrix $B_{vr}$ is determined by performing a Kron reduction on Y. In such embodiments, multiple matrices may be constructed as using Equations (9)-(12) as set forth below:

$$A_K = Y(1:m, 1:m) \quad \text{Equation (9)}$$

$$B_K = Y(1:m, m+1:n) \quad \text{Equation (10)}$$

$$C_K = Y(m+1:n, 1:m) \quad \text{Equation (11)}$$

$$D_K = Y(m+1:n, m+1:n) \quad \text{Equation (12)}$$

Accordingly, the following Kron-reduced admittance matrix can then be identified using Equation (13) below:

$$Y_{vr} = A_K - B_K (D_K^{-1}) C_K = G_{vr} + jB_{vr} \quad \text{Equation (13)}$$

Where $B_{vr}$ represents the Kron-reduced susceptance matrix, accommodating for virtual reactances, which can be utilized in the following analysis.

More specifically, in an embodiment, the system 400 is configured to run a power-flow for the post-event network to determine the post-event stable equilibrium. In such embodiments, the identification of the stable equilibrium is a prerequisite to making use of the energy function set forth in Equation (6).

Moreover, in an embodiment, where the model represented by Equations (5) is reduced, with Y=$Y_{vr}$, and $P_{0vr}$, $\tau_{vr}$, and $m_{fvr}$ are employed as control setpoints and parameters. The resulting nonlinear vector-value differential equation set is Equation (14):

$$\dot{\omega} = M_{vr}^{-1}(P_{Ivr} - P_{Nvr}(\delta, V) - D_{vr}\omega)$$

$$\dot{\delta} = \omega \quad \text{Equation (14)}$$

where:

$$P_{Nvr}\delta^{\Box m} = A_{vr} \text{diag}(bl_{vr}) \text{diag}(e^{|A_{vr}|^T ln(V)}) \sin(A_{vr}^T \delta)$$

$$P_{Ivr} \in \Box^m = [P_{0vr} - P_{Lr}]$$

and where $A_{vr}$ and $bl_{vr}$ are the incidence matrix and susceptance vector associated with $Y_{vr}$, respectively; inertia and damping terms $M_{vr}$ and $D_{vr}$ are re-evaluated using $\tau_{vr}$ and $m_{fvr}$; and $P_{Lr}$ represents an approximation of the active power load appearing at each source node, following Kron reduction. In such embodiments, after the Kron reduction, the number of sources, m and nodes n may be the same (e.g., m=n), hence $L_1$ maybe dropped from Equation (14) as it becomes the identity matrix.

In particular embodiments, the local controller(s) 402 can execute a step-change in active power dispatch setpoint from $P_0$ to $P_{0vr}$ at the beginning of the event (i.e., immediately after an overload is detected), and that this setpoint will not deviate from $P_{0vr}$ until equilibrium is first reached. For IBRs expected to employ virtual reactance during the considered contingency, corresponding elements of $P_0$ are reduced from their nominal values to $P_0$, consistent with the system-level overload ride-through control module 414 and system-wide energy function approach described above.

Accordingly, a power flow analysis can be executed for Equation (14) using the modified power dispatch setpoint vector $P_{0vr}$ to be utilized by the IBRs during the considered contingencies. In order words, the stable post-event equilibrium $\delta^s$ and $V^s$ should be found, using knowledge of $B_{vr}$, $P_{0vr}$ and $P_{Lr}$. It should also be understood that a power flow analysis of Equations (5) can also be used to identify the same stable equilibrium.

In further embodiments, IBRs can be regarded as PV nodes, with active power injection of inverter 'i' equal to its setpoint $P_{0vr}$, and voltage magnitude of the inverter at node i∈(1, 2, . . . , m−1, m) equal to the first 'm' elements of V. Depending upon the network size, in an embodiment, the Gauss-Seidel method, Newton-Raphson method, or a complementary combination of the two may be used to determine $\delta^s$ and $V^s$. For example, in certain embodiments, the determine $\delta^s$ and $V^s$ via the Gauss-Seidel method, for example, Equation (15) below can be used:

$$\frac{P_k - jQ_k}{\tilde{V}_k^*} = Y_{vr,kk}\tilde{V}_k + \sum_{\substack{i=1 \\ i \neq k}}^{n} Y_{vr,ki}\tilde{V}_i \qquad \text{Equation (15)}$$

Where $\tilde{V}_k = V_i \angle \delta_i$ represents the voltage phasor at node k, and P and Q represent net active and reactive power injected at that node, respectively. A 'flat start' guess can be used as the starting point for the power flow analysis: i.e., all voltages can be assumed to be one per-unit, and all angles can be assumed to be zero.

In additional embodiments, the system 400 is further configured to determine the region of attraction exit point for 'on-fault' dynamics. In such embodiments, the system 400 can run numerical integration to obtain the system trajectory during the grid event as the system 400 exits the region of attraction surrounding the stable equilibrium (the potential energy 'well'). While in actuality the event (such as a fault) may be cleared prior to this exit, it is temporarily assumed that this is not the case for purposes of identifying the location of the unstable equilibrium.

Thus, in such embodiments, to initialize the dynamics states of the system 400 prior to employing numerical integration, the power-flow associated with Equation (15) can be repeated for the pre-event network for the case in which nominal control setpoints and parameters are used and no virtual reactance is employed.

Numerical integration can be performed using explicit or implicit methods to determine $\omega(t)$ and $\delta(t)$ for $t > T_e$, with a primitive forward Euler approach provided in Equation (16) below:

$$\begin{bmatrix}\omega \\ \delta\end{bmatrix}^{k+1} = \begin{bmatrix}\omega \\ \delta\end{bmatrix}^k + \Delta T \cdot \begin{bmatrix} M_{vr}^{-1}(P_{Ivr} - P_{Nvr}(\delta^k, V) - D_{vr}\omega^k) \\ \omega^k \end{bmatrix} \qquad \text{Equation (17)}$$

Where $\Delta T$ is the timestep used for numerical integration.

While performing the numerical integration using Equation (17), the peak value of the potential energy function along the trajectory of $\omega(t)$ and $\delta(t)$ is determined, numerically. This can be accomplished by evaluating the numerical approximations of the first and second time derivatives of the potential energy function Equation (8) along the trajectory of $\omega(t)$ and $\delta(t)$ as provided in Equations (18) and (19) below:

$$V'_{PE} := \frac{\Delta V_{PE}}{\Delta T} = \frac{V_{PE}^{k+1} - V_{PE}^{k}}{\Delta T} \qquad \text{Equation (18)}$$

$$V''_{PE} := \frac{\Delta V'_{PE}}{\Delta T} = \frac{V_{PE}'^{k+1} - V_{PE}'^{k}}{\Delta T} \qquad \text{Equation (19)}$$

The first zero crossing of $V_{PE}'$ that occurs when $V_{PE}''$ is negative, at the point $\delta^{RL1}$, should correspond to the crossing of the potential energy 'ridgeline', i.e., the exiting of the potential energy 'well' that surrounds the stable equilibrium.

Following the gradient of the analytical potential energy (PE) function, a practical method by which to approximately locate the controlling unstable equilibrium is to trace the ridgeline of the potential energy surface, starting from the point $\delta_{RL1}$ that was discovered using Equations (18) and (19). This can be accomplished by traveling in the direction of Equation (20), the negative gradient of the potential energy function as represented below:

$$-\nabla V_{PE}(\delta) = -\begin{bmatrix}\frac{\partial V_{PE}(\delta)}{\partial \delta_1} \\ \frac{\partial V_{PE}(\delta)}{\partial \delta_2} \\ \vdots \\ \frac{\partial V_{PE}(\delta)}{\partial \delta_n}\end{bmatrix} \qquad \text{Equation (20)}$$

Assuming that the potential energy of the ridgeline declines in the direction of the controlling unstable equilibrium, and assuming that the potential energy surface in the proximity of the ridgeline is sufficiently smooth, the steepest down-sloping direction, i.e., the negative gradient, defined in Equation (20), should be parallel to the ridgeline and in the direction of the controlling unstable equilibrium point. Further, the ridgeline tracing using Equation (20) can be terminated by examining the second derivative of the norm of Equation (20). A zero crossing of the second numerical derivative of the negative gradient magnitude, taken along the trajectory traced using Equation (20), indicates that the saddle point is close.

Moreover, in an embodiment, the second numerical derivative of the negative gradient magnitude is given by Equation (22) below, where 'k' denotes the sample point along the S defined by Equation (20) above.

$$|\nabla V_{PE}|' := |\nabla V_{PE}|^{k+} - |\nabla V_{PE}|^k \qquad \text{Equation (21)}$$

$$|\nabla V_{PE}|'' := |\nabla V_{PE}|'^{k+1} - |\nabla V_{PE}|'^k \qquad \text{Equation (22)}$$

The point at which Equation (22) crosses zero can be defined as $\delta^{RL2}$, and provides a starting point for application of a homotopy-based method to solve for the controlling unstable equilibrium point.

In further embodiments, a modified version of the Kron-reduced vector differential Equation (14) is provided in Equation (23) below. Thus, it can be easily observed that if Equation (23) is in equilibrium and $\omega''=0$, then the reduced version of Equations (5) will also be in equilibrium.

$$\frac{d\delta}{dt} = M_{vi}^{-1}(P_{Ivi} - P_{Nvi}(\delta, V) - D_{vi}\omega) = F(\delta) = 0 \qquad \text{Equation (23)}$$

In such embodiments, the system 400 is configured to solve for solution, $\delta''$, to $0 = F(\delta'')$. Thus, in the homotopy analysis method, a function $G(\lambda)$ (with a known solution) and parameter $\lambda$ are inserted into Equation (23) to create the modified system, as represented by Equation (24) below:

$$H(\delta,\lambda) = (1-\lambda)F(\partial) + \lambda G(\delta) = 0 \qquad \text{Equation (24)}$$

Note that if $\lambda = 1$:

$$H(\delta,\lambda) = H(\delta,1) = G(\delta)$$

In contrast, if $\lambda = 0$:

$$H(\delta,\lambda) = H(\delta,0) = F(\delta)$$

In the case that $\lambda = 1$, the solution to $H(\delta, \lambda)$ is known, since $H(\delta, \lambda) = G(\delta)$ at that value of $\lambda$ and the solution to $G(\delta)$ is known by definition.

In such embodiments, a number of options exist for selection of G(δ). For example, in an embodiment relating to a 'fixed point' method, Equation (25) may be used:

$$G(\delta) = \delta - \delta_0 \quad \text{Equation (25)}$$

Once G(δ) is selected, it is necessary to choose a starting point $\delta_0$ sufficiently close to the solution. Thus, in an embodiment, the estimate of the controlling unstable equilibrium point $\delta_{RL2}$, obtained earlier by observing the zero crossing of Equation (22), can serve this purpose.

Furthermore, in an embodiment, the solution to H(δ, λ)=0 can be repeatedly calculated (e.g., using the Newton method or a Trust-Region method) as λ may be incrementally decreased from 1 to zero. In particular embodiments, $\lambda^{k+1} < \lambda_k$, thus, in the aforementioned repeated solution determination, the solution for δ obtained for H(δ, $\lambda^k$)=0 can be used as a starting point for the application of the Newton method to H(δ, $\lambda^{k+1}$)=0. Once λ has been sufficiently decremented such that it reaches zero, the solution $\delta^u$ of H(δ, 0)=F(δ)=0 is obtained.

Figure 16:
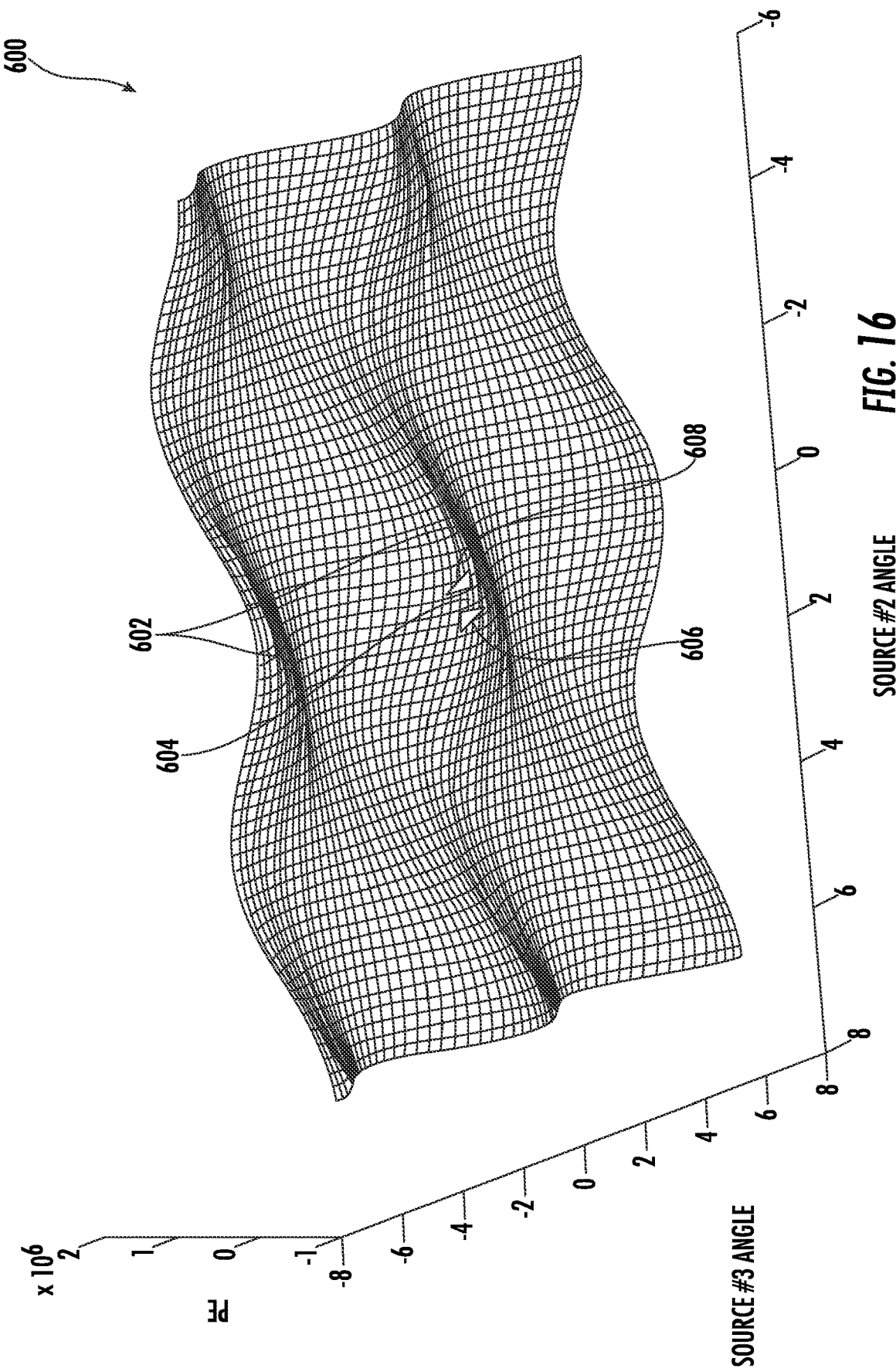
FIG. 16 illustrates a plot of a potential energy surface for the three-source system of FIG. 13 with no virtual impedance being implemented by either of the inverter-based resources according to the present disclosure.
Figure 17:
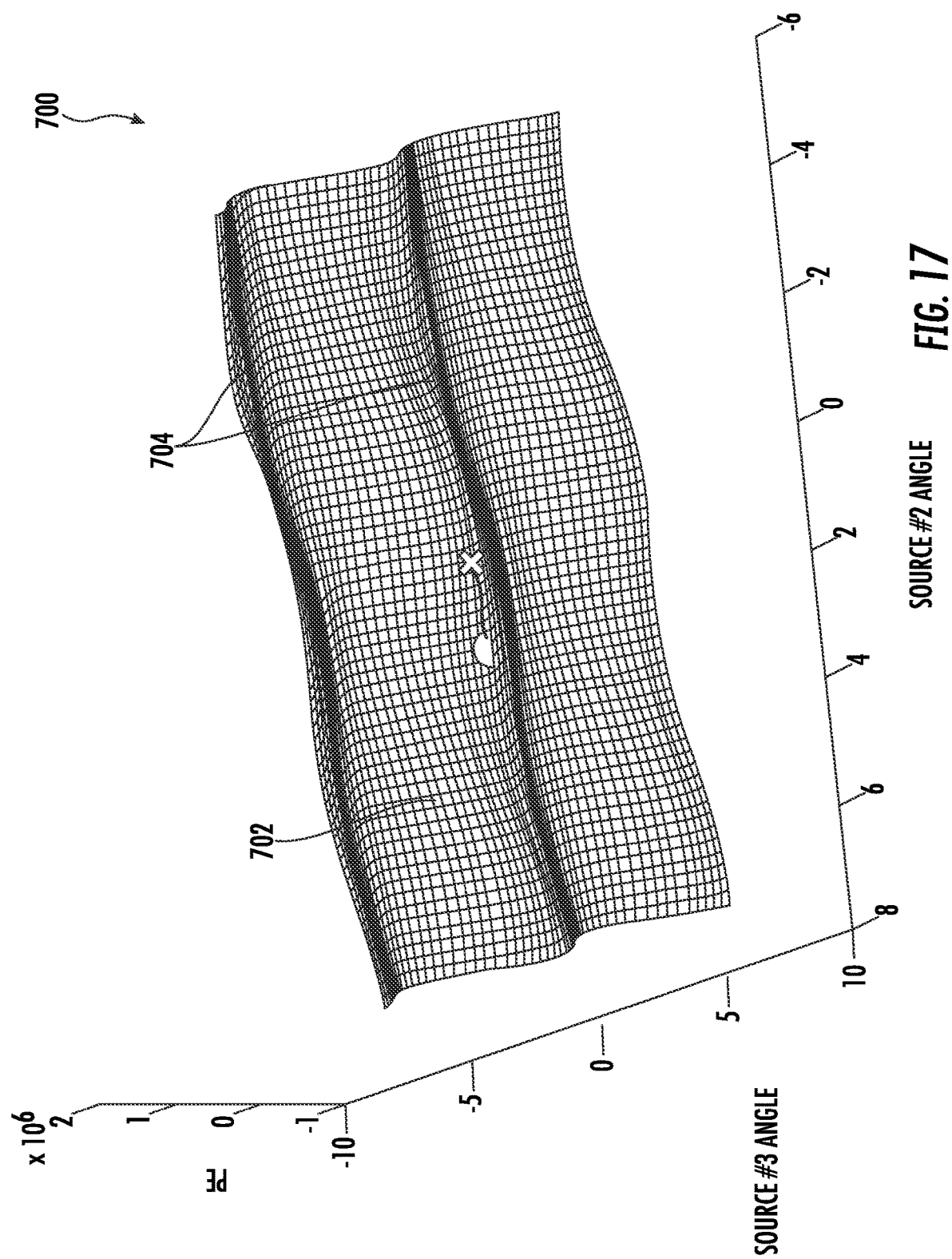
FIG. 17 illustrates a plot of a potential energy surface for the three-source system of FIG. 13 with a 1.0 per-unit virtual impedance being implemented by one of the inverter-based resources according to the present disclosure.
Figure 18:
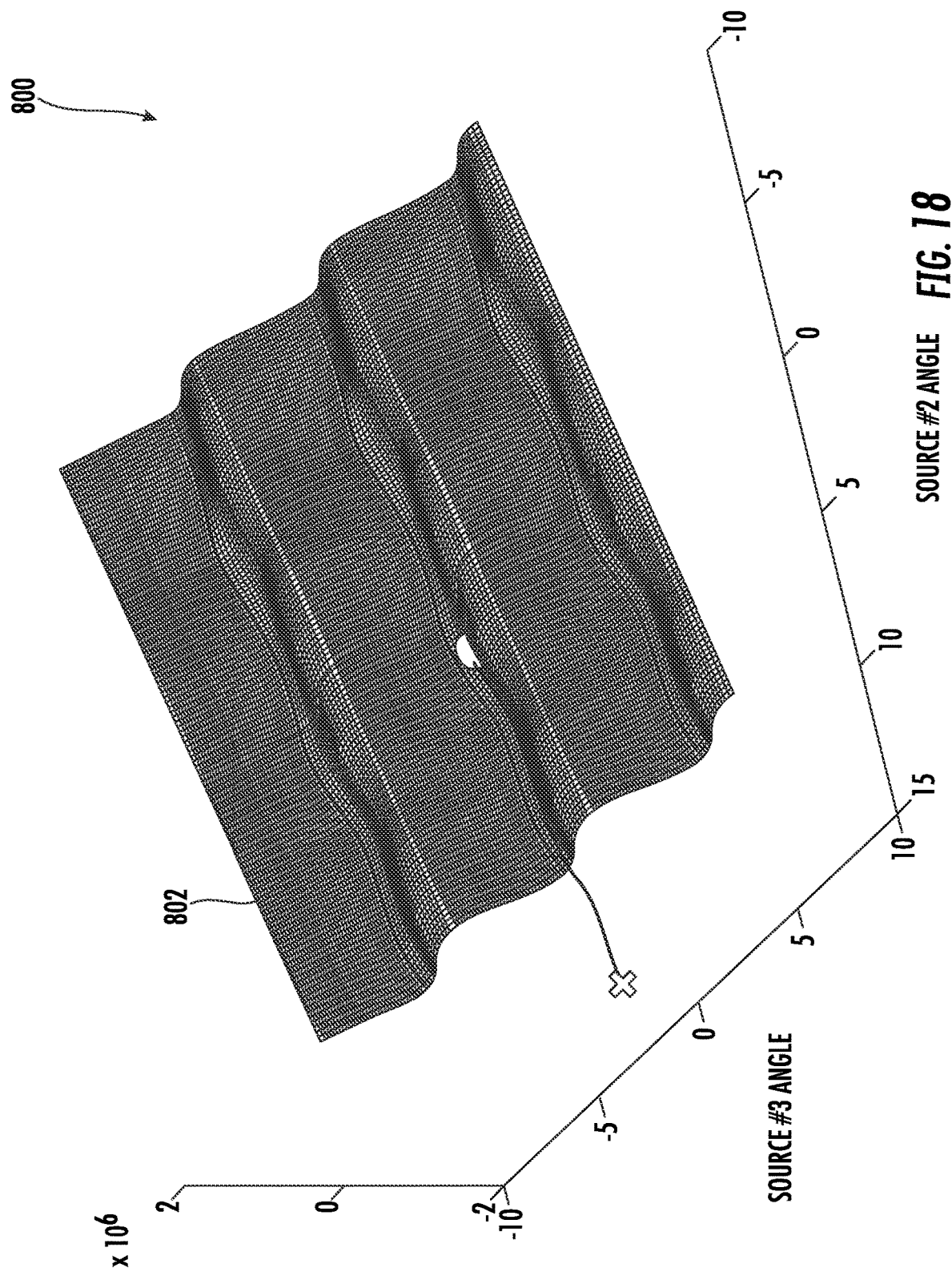
FIG. 18 illustrates a plot of a potential energy surface for the three-source system of FIG. 13 with a 2.0 per-unit virtual impedance being implemented by one of the inverter-based resources according to the present disclosure.

Referring now to FIGS. 16-18, multiple plots of the potential energy surface for different applications of virtual impedance for fault current limiting are provided. In particular, as shown in FIG. 16, a plot 600 of the potential energy surface is illustrated in which no virtual impedance for fault current limiting is being implemented by the IBRs shortly after the fault clears. Thus, as shown, in the case that no virtual impedance is being implemented, the potential energy surface is comprised of a multitude of easily-recognized potential energy wells 602. Each potential energy well 602 can be interpreted as a region of attraction of a stable equilibrium of the nonlinear dynamical system. In particular, the stable equilibrium point is at the bottom of each well 602. The post-event path that the system takes as a function of time, immediately following the clearing of the fault, is plotted in FIG. 16 using line 604. The initial operating point of the system, just after the fault is cleared, is marked as 606, and the final operating point at the end of each simulation is marked with an 608. Thus, if line 604 terminates at a stable equilibrium at the bottom of the potential energy well 602, it means that synchronism of the nonlinear system has been maintained. On the other hand, if the path of the system travels over the ridgeline of the potential energy well 602 in the aftermath of the event, it means that synchronism has been (at least temporarily) lost, i.e., a large-signal instability has occurred. As such, FIG. 16 demonstrates that when no virtual impedance is implemented by the IBRs following the event, the path is relatively short, synchronism is successfully maintained, and there is no large-signal instability.

In certain embodiments, where self-protection is the highest priority, the IBRs must employ a large virtual impedance for fault current limiting during the event and immediately following the event. Furthermore, it should be remarked that virtual reactance will likely still exist immediately after the fault event, for the following reason: the local controllers 402 most likely cannot predict or measure exactly when a fault has been successfully cleared, and therefore will not know exactly when to remove the virtual impedance. Furthermore, even if the clearing of the fault could be accurately detected by each IBR, an immediate and uncoordinated removal of virtual impedance could result in massive active power transfer between the IBRs, since relative voltage angles between IBRs will likely have been increasing without bound during the fault event. Such a control action would thereby likely result in an undesirable limit-cycle of repeated overcurrent events necessitating repeated reapplication of virtual impedance. Since it can be assumed that the virtual impedance must remained engaged in the post event system condition, at least until a stable equilibrium has been reached, the potential energy surface must be replotted to reflect alternative system condition.

FIG. 17 illustrates a plot 700 of an example of the post-event potential energy (PE) surface 702 in the case that virtual impedance used for fault current limiting is being applied. In this case, the potential energy wells 604 become harder to discern, and the region of attraction becomes smaller. As such, FIG. 17 demonstrates an important unintended consequence of the use of virtual impedance for fault current limiting in that there can be a substantial risk of a post-event loss-of-synchronism, which could prevent the return to a stable equilibrium and result in large, cyclic active power transfers between the IBRs. Accordingly, FIG. 18 illustrates a plot 800 of an example of the post-event potential energy surface 802 in the case that an even greater amount of virtual impedance was implemented by the IBRs. In this case, loss of synchronism has occurred, and a stable equilibrium was not reached by the end of the simulation.

Thus, FIGS. 17 and 18 highlight the relevance of the potential energy surface in determining the susceptibility of the system 400 to a loss of synchronism, and motivate the inclusion of Lyapunov function analysis as a component of the system-level overload ride-through control technique described herein. Lyapunov stability analysis techniques can be used to predict whether the total kinetic and potential energy of the system 400 immediately after the clearing of the fault is enough to cause a loss-of-synchronism. The potential energy at the lowest point on the rim of the well surrounding the stable equilibrium point, known as the closest unstable equilibrium point (UEP), can be calculated. The proposed control technique seeks to approximate the position of the unstable equilibrium point (UEP), calculate the potential energy at that UEP, and adjust inverter control parameters to reduce the initial post-fault system energy to offer a guarantee that synchronism will not be lost, all while allowing the IBRs to remain protected from overcurrents through the use of sufficient virtual impedance.

Various aspects and embodiments of the present invention are defined by the following numbered clauses:

Clause 1. A method for controlling a network of inverter-based resources connected to a power grid during a disturbance, the method comprising:
in response to a start of the disturbance, employing a system-level overload ride-through algorithm among the network of inverter-based resources, wherein the
determining, via a system-level overload ride-through control module, a modified parameter set for one or more of the inverter-based resources using regularly-updated system-level analyses;
transmitting, via the system-level overload ride-through control module, the modified parameter set to the one or more of the inverter-based resources; and
automatically activating, via one or more local controllers of the one or more of the inverter-based resources communicatively coupled with the system-level overload ride-through control module, the modified parameter set at a time determined locally by the one or more local controllers, wherein automatically activating the modified parameter set comprises rapidly re-parameterizing one or more parameters of the one or more of the inverter-based resources for a duration of and for a time period after the disturbance so as to transition the network of inverter-based resources from a pre-disturbance stable state to a post-disturbance stable state.

Clause 2. The method of clause 1, wherein determining the modified parameter set for one or more of the inverter-based resources using the regularly-updated system-level analyses further comprises:
setting a virtual reactance for one or more of the inverter-based resources to a value determined by a maximum continuous current rating of one or more of the inverter-based resources in consideration of one or more most stringent ride-through requirements;
setting a modified active power setpoint for one or more of the inverter-based resources to a value equal to a lowest of one of the following: an active power capability of one or more of the inverter-based resources, an estimated maximum active power that can possibly be transmitted through the virtual reactance selected for one of the one or more of the inverter-based resources in a post-disturbance scenario, or a desired value of an active power injection during and immediately following the disturbance;
setting at least one of a modified virtual inertia or a power measurement filter time constant for one or more of the inverter-based resources to a value determined by an amount of energy storage available to one or more of the inverter-based resources; and
adjusting a modified virtual damping for one or more of the inverter-based resources to improve a likelihood of the inverter-based resources reducing an overload condition or retaining synchronism during the disturbance.

Clause 3. The method of clause 2, wherein determining the modified parameter set for one or more of the inverter-based resources using the regularly-updated system-level analyses further comprises:
identifying a set of contingency events and post-event scenarios;
generating a system-wide energy function for each of the post-event scenarios;
determining a critical system energy for one or more of the post-event scenarios, the critical system energy being a maximum permitted post-event potential energy of the network;
for each post-event scenario associated with a given contingency event, determining whether the critical system energy is exceeded, thereby indicating loss of synchronism, at a start of a clearing time, for any of the contingency events; at the clearing time, using a final set of angles of one or more of the inverter-based resources to calculate a total system energy of the network after the disturbance has cleared;
determining whether the critical system energy is exceeded by the total system energy;
if the critical system energy is exceeded by the total system energy in the network after the disturbance has cleared, incrementally reducing an absolute value of the modified active power setpoint for one or more of the inverter-based resources until the critical system energy is no longer exceeded by the total system energy, and if the critical system energy is not exceeded by the total system energy but an energy reserve of any of the inverter-based resources is exceeded during the disturbance, incrementally reducing the modified virtual inertia or the modified virtual damping of that inverter-based resource; and
determining the modified parameter set for one or more of the inverter-based resources once all contingency events have been evaluated for each post-event scenario and the critical system energy and energy limits have not been exceeded for any of the contingency events and post event scenario.

Clause 4. The method of clause 3, wherein at least one of the disturbance and the set of contingency events comprises one of a symmetric or asymmetric line-to-ground or line-to-line fault when islanded or grid-tied, a phase-to-ground fault at an infinite bus, simultaneous or staggered application of a virtual reactance by two or more of the inverter-based resources, a temporary loss of one of the inverter-based resources due to an overload event for that inverter-based resource, a load step, sag, or swell in a voltage magnitude of the power grid when grid-tied, a load step or jump in a phase angle of the power grid when grid-tied, loss of a distribution or transmission line when islanded or grid-tied, unexpected loss of another significant source when islanded or grid-tied, a large step in a constant-power load, constant current load, constant impedance load, or machine load, or combinations thereof when islanded or grid-tied, an intentional or unintentional islanding event, and/or an intentional or unintentional synchronization event.

Clause 5. The method of clause 4, wherein the post-event scenarios comprise at least one of (1) a post-event system identical to a pre-event system, an alternative network topology in which one or more of the inverter-based resources or the power grid have disconnected from the network and are no longer present.

Clause 6. The method of clauses 3-5, wherein the system-wide energy function comprises a kinetic energy (KE) function summed with a potential energy (PE) function.

Clause 7. The method of clause 6, wherein determining the critical system energy for one or more of the post-event scenarios further comprises:
determining a controlling unstable equilibrium point (CUEP); and
determining a potential energy at the CUEP using the PE function to determine the critical system energy for one or more of the post-event scenarios.

Clause 8. The method of clause 7, wherein determining the CUEP further comprises:
computing numerical integration of grid event dynamics until a ridgeline of a PE surface defined by the PE function is crossed;
tracing a gradient of the PE function along the ridgeline of the PE surface to determine an acceptable initial starting point for a homotopy method; and
applying the homotopy method to locate the CUEP.

Clause 9. The method of any of the preceding clauses, further comprising:
monitoring, via the system-level overload ride-through module, one or more grid conditions to determine when it is safe for the one or more inverter-based resources to deactivate the modified parameter set; and
upon determining it is safe for the one or more inverter-based resources to deactivate the modified parameter set, sending, via the system-level overload ride-through module, a reset signal to the one or more inverter-based resources to deactivate the modified parameter set and return to nominal operating parameters.

Clause 10. The method of any of the preceding clauses, wherein the time determined locally by the one or more inverter-based resources corresponds to an instant of time at which the local controller detects an overload condition, the overload condition being indicative of the start of the disturbance.

Clause 11. The method of any of the preceding clauses, wherein the network of the one or more inverter-based resources further comprises a plurality of inverter-based resources, and wherein the one or more parameters within the modified parameter set may differ among the plurality of inverter-based resources.

Clause 12. The method of any of the preceding clauses, further comprising continuing to operate the one or more inverter-based resources via the one or more local controllers using nominal operating parameters if no disturbance is detected.

Clause 13. The method of any of the preceding clauses, wherein the inverter-based resources are one of a wind turbine, an energy storage system, or a solar power system.

Clause 14. A system for controlling a network of inverter-based resources connected to a power grid during a disturbance, the system comprising:

a system-level overload ride-through control module for controlling the system; and a plurality of local controllers communicatively coupled to the system-level overload ride-through control module for controlling the inverter-based resources, the system-level overload ride-through control module comprising at least one processor configured to perform a plurality of operations, the plurality of operations comprising: in response to a start of the disturbance, employing a system-level overload ride-through algorithm among the network of inverter-based resources, wherein the determining a modified parameter set for one or more of the inverter-based resources using regularly-updated system-level analyses; and transmitting the modified parameter set to the plurality of local controllers of the one or more of the inverter-based resources, the plurality of local controllers configured to automatically activate the modified parameter set at a time determined locally by the one or more local controllers, wherein automatically activating the modified parameter set comprises rapidly re-parameterizing one or more parameters of the one or more of the inverter-based resources for a duration of and for a time period after the disturbance so as to transition the network of inverter-based resources from a pre-disturbance stable state to a post-disturbance stable state.

Clause 15. The system of clause 14, wherein determining the modified parameter set for one or more of the inverter-based resources using the regularly-updated system-level analyses further comprises:

setting a virtual reactance for one or more of the inverter-based resources to a value determined by a maximum continuous current rating of one or more of the inverter-based resources in consideration of one or more most stringent ride-through requirements;

setting a modified active power setpoint for one or more of the inverter-based resources to a value equal to a lowest of one of the following: an active power capability of one or more of the inverter-based resources, an estimated maximum active power that can possibly be transmitted through the virtual reactance selected for one of the one or more of the inverter-based resources in a post-disturbance scenario, or a desired value of an active power injection during and immediately following the disturbance;

setting at least one of a modified virtual inertia or a power measurement filter time constant for one or more of the inverter-based resources to a value determined by an amount of energy storage available to one or more of the inverter-based resources; and decreasing a modified virtual damping for one or more of the inverter-based resources by a substantial factor relative to a nominal virtual damping value to make the modified virtual damping negligible in comparison to the modified virtual inertia.

Clause 16. The system of clause 15, wherein determining the modified parameter set for one or more of the inverter-based resources using the regularly-updated system-level analyses further comprises:

identifying a set of contingency events and post-event scenarios;

generating a system-wide energy function for each of the post-event scenarios;

determining a critical system energy for one or more of the post-event scenarios, the critical system energy being a maximum permitted post-event potential energy of the network;

for each post-event scenario associated with a given contingency event, determining whether the critical system energy is exceeded, thereby indicating loss of synchronism, at a start of a clearing time, for any of the contingency events; at the clearing time, using a final set of angles of one or more of the inverter-based resources to calculate a total system energy of the network after the disturbance has cleared;

determining whether the critical system energy is exceeded by the total system energy;

if the critical system energy is exceeded by the total system energy in the network after the disturbance has cleared, incrementally reducing an absolute value of the modified active power setpoint for one or more of the inverter-based resources until the critical system energy is no longer exceeded by the total system energy, and if the critical system energy is not exceeded by the total system energy but an energy reserve of any of the inverter-based resources is exceeded during the disturbance, incrementally reducing the modified virtual inertia or the modified virtual damping of that inverter-based resource; and determining the modified parameter set for one or more of the inverter-based resources once all contingency events have been evaluated for each post-event scenario and the critical system energy and energy limits have not been exceeded for any of the contingency events and post event scenario.

Clause 17. The system of clause 16, wherein the system-wide energy function comprises a kinetic energy (KE) function summed with a potential energy (PE) function.

Clause 18. The system of clause 17, wherein determining the critical system energy for one or more of the post-event scenarios further comprises:

determining a controlling unstable equilibrium point (CUEP); and determining a potential energy at the CUEP using the PE function to determine the critical system energy for one or more of the post-event scenarios.

Clause 19. The system of clause 18, wherein determining the CUEP further comprises:

computing numerical integration of grid event dynamics until a ridgeline of a PE surface defined by the PE function is crossed;

tracing a gradient of the PE function along the ridgeline of the PE surface to determine an acceptable initial starting point for a homotopy method; and applying the homotopy method to locate the CUEP.

Clause 20. The system of clauses 14-19, further comprising:
monitoring, via the system-level overload ride-through module, one or more grid conditions to determine when it is safe for the one or more inverter-based resources to deactivate the modified parameter set; and
upon determining it is safe for the one or more inverter-based resources to deactivate the modified parameter set, sending, via the system-level overload ride-through module, a reset signal to the one or more inverter-based resources to deactivate the modified parameter set and return to nominal operating parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a network of inverter-based resources connected to a power grid during a disturbance, the method comprising:
in response to a start of the disturbance, employing a system-level overload ride-through algorithm among the network of inverter-based resources, wherein the system-level overload ride-through algorithm comprises:
determining, via a system-level overload ride-through control module, a modified parameter set for one or more of the inverter-based resources using regularly-updated system-level analyses;
transmitting, via the system-level overload ride-through control module, the modified parameter set to the one or more of the inverter-based resources; and
automatically activating, via one or more local controllers of the one or more of the inverter-based resources communicatively coupled with the system-level overload ride-through control module, the modified parameter set at a time determined locally by the one or more local controllers, wherein automatically activating the modified parameter set comprises rapidly re-parameterizing one or more parameters of the one or more of the inverter-based resources for a duration of and for a time period after the disturbance so as to transition the network of inverter-based resources from a pre-disturbance stable state to a post-disturbance stable state.

2. The method of claim 1, wherein determining the modified parameter set for one or more of the inverter-based resources using the regularly-updated system-level analyses further comprises:
setting a virtual reactance for one or more of the inverter-based resources to a value determined by a maximum continuous current rating of one or more of the inverter-based resources in consideration of one or more most stringent ride-through requirements;
setting a modified active power setpoint for one or more of the inverter-based resources to a value equal to a lowest of one of the following: an active power capability of one or more of the inverter-based resources, an estimated maximum active power that can possibly be transmitted through the virtual reactance selected for one of the one or more of the inverter-based resources in a post-disturbance scenario, or a desired value of an active power injection during and immediately following the disturbance;
setting at least one of a modified virtual inertia or a power measurement filter time constant for one or more of the inverter-based resources to a value determined by an amount of energy storage available to one or more of the inverter-based resources; and
adjusting a modified virtual damping for one or more of the inverter-based resources to improve a likelihood of the inverter-based resources reducing an overload condition or retaining synchronism during the disturbance.

3. The method of claim 2, wherein determining the modified parameter set for one or more of the inverter-based resources using the regularly-updated system-level analyses further comprises:
identifying a set of contingency events and post-event scenarios;
generating a system-wide energy function for each of the post-event scenarios;
determining a critical system energy for one or more of the post-event scenarios, the critical system energy being a maximum permitted post-event potential energy of the network;
for each post-event scenario associated with a given contingency event, determining whether the critical system energy is exceeded, thereby indicating loss of synchronism, at a start of a clearing time, for any of the contingency events;
at the clearing time, using a final set of angles of one or more of the inverter-based resources to calculate a total system energy of the network after the disturbance has cleared;
determining whether the critical system energy is exceeded by the total system energy;
if the critical system energy is exceeded by the total system energy in the network after the disturbance has cleared, incrementally reducing an absolute value of the modified active power setpoint for one or more of the inverter-based resources until the critical system energy is no longer exceeded by the total system energy, and if the critical system energy is not exceeded by the total system energy but an energy reserve of any of the inverter-based resources is exceeded during the disturbance, incrementally reducing the modified virtual inertia or the modified virtual damping of that inverter-based resource; and
determining the modified parameter set for one or more of the inverter-based resources once all contingency events have been evaluated for each post-event scenario and the critical system energy and energy limits have not been exceeded for any of the contingency events and post event scenario.

4. The method of claim 3, wherein at least one of the disturbance and the set of contingency events comprises one of a symmetric or asymmetric line-to-ground or line-to-line fault when islanded or grid-tied, a phase-to-ground fault at an infinite bus, simultaneous or staggered application of a virtual reactance by two or more of the inverter-based resources, a temporary loss of one of the inverter-based resources due to an overload event for that inverter-based resource, a load step, sag, or swell in a voltage magnitude of the power grid when grid-tied, a load step or jump in a phase angle of the power grid when grid-tied, loss of a distribution or transmission line when islanded or grid-tied, unexpected loss of another significant source when islanded or grid-tied, a large step in a constant-power load, constant current load, constant impedance load, or machine load, or combinations thereof when islanded or grid-tied, an intentional or unintentional islanding event, and/or an intentional or unintentional synchronization event.

5. The method of claim 4, wherein the post-event scenarios comprise at least one of (1) a post-event system identical to a pre-event system, an alternative network topology in which one or more of the inverter-based resources or the power grid have disconnected from the network and are no longer present.

6. The method of claim 3, wherein the system-wide energy function comprises a kinetic energy (KE) function summed with a potential energy (PE) function.

7. The method of claim 6, wherein determining the critical system energy for one or more of the post-event scenarios further comprises:
 determining a controlling unstable equilibrium point (CUEP); and
 determining a potential energy at the CUEP using the PE function to determine the critical system energy for one or more of the post-event scenarios.

8. The method of claim 7, wherein determining the CUEP further comprises:
 computing numerical integration of grid event dynamics until a ridgeline of a PE surface defined by the PE function is crossed;
 tracing a gradient of the PE function along the ridgeline of the PE surface to determine an acceptable initial starting point for a homotopy method; and
 applying the homotopy method to locate the CUEP.

9. The method of claim 1, further comprising:
 monitoring, via the system-level overload ride-through module, one or more grid conditions to determine when it is safe for the one or more inverter-based resources to deactivate the modified parameter set; and
 upon determining it is safe for the one or more inverter-based resources to deactivate the modified parameter set, sending, via the system-level overload ride-through module, a reset signal to the one or more inverter-based resources to deactivate the modified parameter set and return to nominal operating parameters.

10. The method of claim 1, wherein the time determined locally by the one or more inverter-based resources corresponds to an instant of time at which the local controller detects an overload condition, the overload condition being indicative of the start of the disturbance.

11. The method of claim 1, wherein the network of the one or more inverter-based resources further comprises a plurality of inverter-based resources, and wherein the one or more parameters within the modified parameter set may differ among the plurality of inverter-based resources.

12. The method of claim 1, further comprising continuing to operate the one or more inverter-based resources via the one or more local controllers using nominal operating parameters if no disturbance is detected.

13. The method of claim 1, wherein the inverter-based resources are one of a wind turbine, an energy storage system, or a solar power system.

14. A system for controlling a network of inverter-based resources connected to a power grid during a disturbance, the system comprising:
 a system-level overload ride-through control module for controlling the system; and
 a plurality of local controllers communicatively coupled to the system-level overload ride-through control module for controlling the inverter-based resources, the system-level overload ride-through control module comprising at least one processor configured to perform a plurality of operations, the plurality of operations comprising:
  in response to a start of the disturbance, employing a system-level overload ride-through algorithm among the network of inverter-based resources, wherein the system-level overload ride-through algorithm comprises:
   determining a modified parameter set for one or more of the inverter-based resources using regularly-updated system-level analyses; and
   transmitting the modified parameter set to the plurality of local controllers of the one or more of the inverter-based resources,
 the plurality of local controllers configured to automatically activate the modified parameter set at a time determined locally by the one or more local controllers, wherein automatically activating the modified parameter set comprises rapidly re-parameterizing one or more parameters of the one or more of the inverter-based resources for a duration of and for a time period after the disturbance so as to transition the network of inverter-based resources from a pre-disturbance stable state to a post-disturbance stable state.

15. The system of claim 14, wherein determining the modified parameter set for one or more of the inverter-based resources using the regularly-updated system-level analyses further comprises:
 setting a virtual reactance for one or more of the inverter-based resources to a value determined by a maximum continuous current rating of one or more of the inverter-based resources in consideration of one or more most stringent ride-through requirements;
 setting a modified active power setpoint for one or more of the inverter-based resources to a value equal to a lowest of one of the following: an active power capability of one or more of the inverter-based resources, an estimated maximum active power that can possibly be transmitted through the virtual reactance selected for one of the one or more of the inverter-based resources in a post-disturbance scenario, or a desired value of an active power injection during and immediately following the disturbance;
 setting at least one of a modified virtual inertia or a power measurement filter time constant for one or more of the inverter-based resources to a value determined by an amount of energy storage available to one or more of the inverter-based resources; and
 decreasing a modified virtual damping for one or more of the inverter-based resources by a substantial factor relative to a nominal virtual damping value to make the modified virtual damping negligible in comparison to the modified virtual inertia.

16. The system of claim 15, wherein determining the modified parameter set for one or more of the inverter-based resources using the regularly-updated system-level analyses further comprises:
 identifying a set of contingency events and post-event scenarios;
 generating a system-wide energy function for each of the post-event scenarios;

determining a critical system energy for one or more of the post-event scenarios, the critical system energy being a maximum permitted post-event potential energy of the network;

for each post-event scenario associated with a given contingency event, determining whether the critical system energy is exceeded, thereby indicating loss of synchronism, at a start of a clearing time, for any of the contingency events;

at the clearing time, using a final set of angles of one or more of the inverter-based resources to calculate a total system energy of the network after the disturbance has cleared;

determining whether the critical system energy is exceeded by the total system energy;

if the critical system energy is exceeded by the total system energy in the network after the disturbance has cleared, incrementally reducing an absolute value of the modified active power setpoint for one or more of the inverter-based resources until the critical system energy is no longer exceeded by the total system energy, and if the critical system energy is not exceeded by the total system energy but an energy reserve of any of the inverter-based resources is exceeded during the disturbance, incrementally reducing the modified virtual inertia or the modified virtual damping of that inverter-based resource; and determining the modified parameter set for one or more of the inverter-based resources once all contingency events have been evaluated for each post-event scenario and the critical system energy and energy limits have not been exceeded for any of the contingency events and post event scenario.

17. The system of claim 16, wherein the system-wide energy function comprises a kinetic energy (KE) function summed with a potential energy (PE) function.

18. The system of claim 17, wherein determining the critical system energy for one or more of the post-event scenarios further comprises:

determining a controlling unstable equilibrium point (CUEP); and determining a potential energy at the CUEP using the PE function to determine the critical system energy for one or more of the post-event scenarios.

19. The system of claim 18, wherein determining the CUEP further comprises:

computing numerical integration of grid event dynamics until a ridgeline of a PE surface defined by the PE function is crossed;

tracing a gradient of the PE function along the ridgeline of the PE surface to determine an acceptable initial starting point for a homotopy method; and applying the homotopy method to locate the CUEP.

20. The system of claim 14, further comprising:

monitoring, via the system-level overload ride-through module, one or more grid conditions to determine when it is safe for the one or more inverter-based resources to deactivate the modified parameter set; and upon determining it is safe for the one or more inverter-based resources to deactivate the modified parameter set, sending, via the system-level overload ride-through module, a reset signal to the one or more inverter-based resources to deactivate the modified parameter set and return to nominal operating parameters.

* * * * *